(12) United States Patent
Bifolco et al.

(10) Patent No.: US 12,014,407 B2
(45) Date of Patent: *Jun. 18, 2024

(54) ADAPTIVE SCHEDULING TO FACILITATE OPTIMIZED DISTRIBUTION OF SUBSCRIBED ITEMS

(71) Applicant: OrderGroove, LLC, New York, NY (US)

(72) Inventors: Michael Bifolco, Irvington, NY (US); Bradley Williams Groff, Brooklyn, NY (US); Greg E. Alvo, Miami, FL (US); Paul Fredrich, Brooklyn, NY (US); Ofir Shalom, Jersey City, NJ (US); Juan Gutierrez, Hinesburg, VT (US); Marcos Moyano, Rosario (AR)

(73) Assignee: OrderGroove, LLC, Miami, FL (US)

( * ) Notice: Subject to any disclaimer, the term of this patent is extended or adjusted under 35 U.S.C. 154(b) by 132 days.

This patent is subject to a terminal disclaimer.

(21) Appl. No.: 17/711,560

(22) Filed: Apr. 1, 2022

(65) Prior Publication Data

US 2023/0316220 A1    Oct. 5, 2023

Related U.S. Application Data

(63) Continuation of application No. 16/930,825, filed on Jul. 16, 2020, now Pat. No. 11,328,333, which is a
(Continued)

(51) Int. Cl.
G06Q 30/06 (2023.01)
G06Q 30/0601 (2023.01)
G06Q 10/087 (2023.01)

(52) U.S. Cl.
CPC ..... *G06Q 30/0619* (2013.01); *G06Q 30/0627* (2013.01); *G06Q 30/0635* (2013.01); *G06Q 30/0641* (2013.01); G06Q 10/087 (2013.01)

(58) Field of Classification Search
CPC ........... G06Q 30/0619; G06Q 30/0627; G06Q 30/0635; G06Q 30/0641
(Continued)

(56) References Cited

U.S. PATENT DOCUMENTS 4,814,996 A    3/1989  Wang
4,869,266 A    9/1989  Taylor et al.
(Continued)

FOREIGN PATENT DOCUMENTS

AU    8694301 A    3/2002
JP    2000148432 A    5/2000
(Continued)

OTHER PUBLICATIONS

Eskridge, Cory W., Notice of Allowance and Fee(s) Due dated Jun. 29, 2023 for U.S. Appl. No. 17/887,756.
(Continued)

*Primary Examiner* — Yogesh C Garg
(74) *Attorney, Agent, or Firm* — KOKKA & BACKUS, PC

(57) ABSTRACT

Various embodiments relate generally to data science and data analysis, computer software and systems, and control systems to provide an interface, and, more specifically, to a computing and data storage platform that implements specialized logic to facilitate adaptive scheduling automatically to optimally distribute items, such as shipping an item in accordance with an adapted frequency for a subscription. In some examples, a method may include identifying item characteristics associated with an item, determining a frequency based on at least an item characteristic in association with a subset of subscriber accounts, generating data representing a frequency and a subset of the item characteristics to integrate with a web page generated for a merchant computing system, and transmitting the formatted data to a
(Continued)

user interface to display a display portion based on the formatted data as an integrated portion of an integrated web page including the web page.

20 Claims, 14 Drawing Sheets

Related U.S. Application Data continuation of application No. 15/821,362, filed on Nov. 22, 2017, now Pat. No. 10,719,860.

(60) Provisional application No. 62/425,191, filed on Nov. 22, 2016.

(58) Field of Classification Search
USPC .............. 705/26.44, 26.1, 26.63, 26.81, 27.1
See application file for complete search history.

(56) References Cited

U.S. PATENT DOCUMENTS

| | | |
|---|---|---|
| 5,090,734 A | 2/1992 | Dyer et al. |
| 6,204,763 B1 | 3/2001 | Sone |
| 6,415,262 B1 | 7/2002 | Walker et al. |
| 6,963,848 B1 | 11/2005 | Brinkerhoff |
| 7,251,617 B1 | 7/2007 | Walker et al. |
| 7,295,990 B1 | 11/2007 | Braumoeller et al. |
| 7,340,414 B2 | 3/2008 | Roh et al. |
| 7,353,194 B1 | 4/2008 | Kerker et al. |
| 7,540,767 B1 | 6/2009 | Czarnecki |
| 7,552,068 B1 | 6/2009 | Brinkerhoff |
| 7,747,543 B1 | 6/2010 | Braumoeller et al. |
| 7,953,645 B2 | 5/2011 | Kerker et al. |
| 8,121,876 B1 | 2/2012 | Braumoeller et al. |
| 8,126,784 B1 | 2/2012 | Agarwal |
| 8,353,448 B1 | 1/2013 | Miller et al. |
| 8,370,271 B1 | 2/2013 | Robinson et al. |
| 8,417,639 B1 | 4/2013 | Baram |
| 8,428,988 B1 | 4/2013 | Braumoeller et al. |
| 8,458,051 B1 | 6/2013 | Saltzman et al. |
| 8,498,888 B1 | 7/2013 | Raff et al. |
| 8,620,707 B1 | 12/2013 | Belyi et al. |
| 8,818,836 B1 | 8/2014 | Braumoeller et al. |
| 8,867,401 B1 | 10/2014 | Tomay et al. |
| 8,924,262 B2 | 12/2014 | Shuster |
| 9,047,607 B1 | 6/2015 | Curial et al. |
| 9,134,675 B2 | 9/2015 | Yang et al. |
| 9,659,310 B1 | 5/2017 | Allen et al. |
| 9,792,643 B1 | 10/2017 | Masterman |
| 9,886,810 B1 | 2/2018 | Murphy |
| 9,959,565 B2 | 5/2018 | Shuster |
| 10,078,860 B1 | 9/2018 | Masterman |
| 10,262,294 B1 | 4/2019 | Hahn et al. |
| 10,275,740 B2 | 4/2019 | Alvo et al. |
| 10,332,067 B2 | 6/2019 | Sirisilla et al. |
| 10,360,617 B2 | 7/2019 | High et al. |
| 10,430,858 B1 | 10/2019 | Glasgow et al. |
| 10,445,751 B2 | 10/2019 | Nakano et al. |
| 10,453,112 B2 | 10/2019 | Alvo et al. |
| 10,586,266 B2 | 3/2020 | Fredrich et al. |
| 10,614,501 B2 | 4/2020 | Fredrich et al. |
| 10,719,860 B2 | 7/2020 | Bifolco et al. |
| 10,769,708 B2 | 9/2020 | Alvo et al. |
| 10,796,274 B2 | 10/2020 | Putcha et al. |
| 10,817,885 B2 | 10/2020 | Concannon et al. |
| 11,144,980 B2 | 10/2021 | Fredrich et al. |
| 11,354,718 B2 | 6/2022 | Fredrich et al. |
| 11,416,810 B2 | 8/2022 | Fredrich et al. |
| 11,599,931 B2 | 3/2023 | Alvo et al. |
| 2002/0161652 A1 | 10/2002 | Paullin et al. |
| 2002/0161670 A1 | 10/2002 | Walker et al. |
| 2003/0004784 A1 | 1/2003 | Li et al. |
| 2003/0110103 A1 | 6/2003 | Sesek et al. |
| 2003/0195788 A1 | 10/2003 | Loeb et al. |
| 2003/0212614 A1 | 11/2003 | Chu et al. |
| 2004/0111326 A1 | 6/2004 | Rock et al. |
| 2004/0162880 A1 | 8/2004 | Arnone et al. |
| 2005/0150951 A1 | 7/2005 | Sacco et al. |
| 2005/0165656 A1 | 7/2005 | Frederick et al. |
| 2006/0025938 A1 | 2/2006 | Cottrell |
| 2008/0015951 A1 | 1/2008 | Kerker et al. |
| 2008/0059309 A1 | 3/2008 | Welch |
| 2008/0071626 A1 | 3/2008 | Hill |
| 2009/0024801 A1 | 1/2009 | Choi et al. |
| 2009/0094121 A1 | 4/2009 | Newhouse et al. |
| 2010/0102082 A1 | 4/2010 | Ebrom et al. |
| 2010/0217450 A1 | 8/2010 | Beal et al. |
| 2010/0280960 A1 | 11/2010 | Ziotopoulos et al. |
| 2011/0032070 A1 | 2/2011 | Bleile |
| 2011/0054935 A1 | 3/2011 | Hardaway |
| 2011/0153466 A1 | 6/2011 | Harish et al. |
| 2011/0246215 A1 | 10/2011 | Postma et al. |
| 2011/0251807 A1 | 10/2011 | Rada et al. |
| 2011/0258072 A1 | 10/2011 | Kerker et al. |
| 2012/0004977 A1 | 1/2012 | Daniels, Jr. et al. |
| 2012/0036045 A1 | 2/2012 | Lowe et al. |
| 2012/0124859 A1 | 5/2012 | May et al. |
| 2012/0150461 A1 | 6/2012 | Ohiwa et al. |
| 2012/0150677 A1 | 6/2012 | Shuster |
| 2012/0330472 A1 | 12/2012 | Boot |
| 2013/0041605 A1 | 2/2013 | Ting et al. |
| 2013/0080968 A1 | 3/2013 | Hanson et al. |
| 2013/0117053 A2 | 5/2013 | Campbell |
| 2013/0128396 A1 | 5/2013 | Danesh et al. |
| 2013/0159454 A1 | 6/2013 | Hunter et al. |
| 2013/0268315 A1 | 10/2013 | Cotton et al. |
| 2014/0012706 A1 | 1/2014 | Foerster |
| 2014/0191573 A1 | 7/2014 | Chen et al. |
| 2014/0258165 A1 | 9/2014 | Heil |
| 2014/0279208 A1 | 9/2014 | Nickitas et al. |
| 2014/0279215 A1 | 9/2014 | Alvo et al. |
| 2014/0279276 A1 | 9/2014 | Tolcher |
| 2014/0279291 A1 | 9/2014 | Brosnan et al. |
| 2014/0297487 A1 | 10/2014 | Bashkin |
| 2014/0304026 A1 | 10/2014 | Delaney et al. |
| 2014/0324598 A1 | 10/2014 | Freeman |
| 2014/0351078 A1 | 11/2014 | Kaplan et al. |
| 2014/0368565 A1 | 12/2014 | Webb et al. |
| 2015/0019342 A1 | 1/2015 | Gupta |
| 2015/0105880 A1 | 4/2015 | Slupik et al. |
| 2015/0106228 A1 | 4/2015 | Shuster |
| 2015/0106238 A1 | 4/2015 | Shuster |
| 2015/0112826 A1 | 4/2015 | Crutchfield, Jr. |
| 2015/0127421 A1 | 5/2015 | Nakano et al. |
| 2015/0149298 A1 | 5/2015 | Tapley |
| 2015/0178654 A1 | 6/2015 | Glasgow et al. |
| 2015/0261644 A1 | 9/2015 | Zhang et al. |
| 2015/0278912 A1 | 10/2015 | Melcher et al. |
| 2015/0302510 A1 | 10/2015 | Godsey et al. |
| 2015/0363866 A1 | 12/2015 | Depew |
| 2015/0363867 A1 | 12/2015 | Tipton et al. |
| 2016/0034024 A1 | 2/2016 | Mergen |
| 2016/0148149 A1 | 5/2016 | Suddamalla et al. |
| 2016/0218884 A1 | 7/2016 | Ebrom et al. |
| 2016/0231792 A1 | 8/2016 | Richter et al. |
| 2016/0275424 A1 | 9/2016 | Concannon et al. |
| 2016/0275530 A1 | 9/2016 | Concannon et al. |
| 2016/0282231 A1* | 9/2016 | Keene ............... G06Q 10/0639 |
| 2016/0286059 A1 | 9/2016 | Hitaka |
| 2016/0314514 A1 | 10/2016 | High et al. |
| 2016/0356641 A1 | 12/2016 | Larson |
| 2016/0371762 A1 | 12/2016 | Fergis et al. |
| 2017/0011304 A1 | 1/2017 | Shimizu |
| 2017/0019266 A1 | 1/2017 | Lim et al. |
| 2017/0032101 A1 | 2/2017 | Skoda |
| 2017/0109687 A1 | 4/2017 | Kamadolli et al. |
| 2017/0134182 A1 | 5/2017 | Davis et al. |
| 2017/0193433 A1 | 7/2017 | Qin et al. |
| 2017/0206489 A1 | 7/2017 | Sirisilla et al. |
| 2017/0300984 A1 | 10/2017 | Hurwich |
| 2018/0005173 A1 | 1/2018 | Elazary et al. |
| 2018/0031616 A1 | 2/2018 | Hansen et al. |
| 2018/0053153 A1 | 2/2018 | Mai |

(56) References Cited

U.S. PATENT DOCUMENTS

| | | |
|---|---|---|
| 2018/0082038 A1 | 3/2018 | Blair et al. |
| 2018/0089614 A1 | 3/2018 | Laskowitz et al. |
| 2018/0131658 A1 | 5/2018 | Bhagwan et al. |
| 2018/0144290 A1 | 5/2018 | Alvo et al. |
| 2018/0144389 A1 | 5/2018 | Fredrich et al. |
| 2018/0204256 A1 | 7/2018 | Bifolco et al. |
| 2018/0249735 A1 | 9/2018 | Espinosa |
| 2018/0253952 A1 | 9/2018 | Huang |
| 2018/0285809 A1 | 10/2018 | Fredrich et al. |
| 2018/0315111 A1 | 11/2018 | Alvo et al. |
| 2018/0322447 A1 | 11/2018 | Cantrell |
| 2018/0336512 A1 | 11/2018 | Clarke et al. |
| 2018/0349980 A1 | 12/2018 | Alvo et al. |
| 2018/0357688 A1 | 12/2018 | Webb et al. |
| 2018/0365753 A1 | 12/2018 | Fredrich et al. |
| 2019/0066183 A1 | 2/2019 | Fredrich et al. |
| 2019/0073627 A1 | 3/2019 | Nakdimon et al. |
| 2019/0087769 A9 | 3/2019 | Glasgow et al. |
| 2019/0295148 A1 | 9/2019 | Lefkow et al. |
| 2019/0295150 A1 | 9/2019 | High et al. |
| 2019/0392378 A1 | 12/2019 | Alvo et al. |
| 2020/0104903 A1 | 4/2020 | Alvo et al. |
| 2020/0250727 A1 | 8/2020 | Fredrich et al. |
| 2020/0250728 A1 | 8/2020 | Fredrich et al. |
| 2021/0004881 A1 | 1/2021 | Bifolco et al. |
| 2021/0049670 A1 | 2/2021 | Alvo et al. |
| 2021/0406984 A1 | 12/2021 | Fredrich et al. |
| 2022/0198545 A1 | 6/2022 | Fredrich et al. |
| 2022/0343387 A1 | 10/2022 | Fredrich et al. |

FOREIGN PATENT DOCUMENTS

| | | |
|---|---|---|
| WO | 2017074757 A1 | 5/2017 |
| WO | 2019089480 A2 | 5/2019 |

OTHER PUBLICATIONS

Koester, Michael Richard, Final Office Action dated Jul. 21, 2023 for U.S. Appl. No. 17/693,341.

Koester, Michael Richard, Non-Final Office Action dated Apr. 10, 2023 for U.S. Appl. No. 16/779,600.

Koester, Michael Richard, Non-Final Office Action dated Mar. 28, 2023 for U.S. Appl. No. 17/693,341.

Mitchell, Nathan A., Notice of Allowance and Fee(s) Due dated Dec. 23, 2022 for U.S. Appl. No. 15/905,764.

Yesildag, Mehmet, Notice of Allowance and Fee(s) Due dated May 11, 2023 for U.S. Appl. No. 17/712,063.

"Belkin WeMo Insight Switch", Belkin Instruction Manual, Part# 8830uk17750/SKU: F7C029uk, Oct. 23, 2014, http://www.free-instruction-manuals.com/pdf/pa_1184191.pdf.

"WeMo Insight Smart Plug, F7C029 Frequently Asked Questions", Belkin Knowledge Article, retrieved Nov. 9, 2017, http://www.belkin.com/us/support-article?articleNum=80139.

Alvo et al., "Consumable Usage Sensors and Applications to Facilitate Automated Replenishment of Consumables via an Adaptive Distribution Platform," U.S. Appl. No. 62/579,871, filed Dec. 31, 2017.

Alvo et al., "Consumable Usage Sensors and Applications to Facilitate Automated Replenishment of Consumables via an Adaptive Distribution Platform," U.S. Appl. No. 15/801,002, filed Nov. 1, 2017.

Alvo et al., "Consumable Usage Sensors and Applications to Facilitate Automated Replenishment of Consumables via an Adaptive Distribution Platform," U.S. Appl. No. 62/579,872.

Alvo et al., "Consumable Usage Sensors and Applications to Facilitate Automated Replenishment of Consumables via an Adaptive Distribution Platform," U.S. Appl. No. 15/801,172, filed Nov. 1, 2017.

Alvo et al., "Sensors and Executable Instructions to Compute Consumable Usage to Automate Replenishment or Service of Consumables via an Adaptive Distribution Platform," U.S. Appl. No. 15/905,764, filed Feb. 26, 2018.

Alvo et al., Consumable Usage Sensors and Applications to Facilitate Automated Replenishment of Consumables via an Adaptive Distribution Platform, U.S. Appl. No. 16/398,241, filed Apr. 29, 2019.

Alvo, Greg, "Automated Method and System for Converting One-Time Buyers of a Product/Service Into Recurring Subscribers", U.S. Appl. No. 61/791,873, filed Mar. 15, 2013.

Amazon Dash Replenishment Adds New Device Makers and Launches New Products. Retrieved from https://www.businesswire.com/news/home/20161122005355/en/Amazon-Dash-Replenishment-Adds-New-Device-Makers-and- Launches-New-Products. Originally published Nov. 22, 2016. (Year: 2016).

Amazon, "Order a Subscribe & Save Subscription," archived back at least as far as Oct. 2014, accessed Jul. 10, 2019 at https://web.archive.org/web/20141009140840/http://www.amazon.com/gp/help/customer/display.html?nodeId=201125870.

Anonymous, Amazon.com Launches Magazines Store; Customers Can Now Purchase Magazine Subscriptions for Themselves or as Gifts on Amazon.com, Oct. 30, 2001, Business Water, pp. 1-2. (Year: 2001).

Bargeon, Brittany E., Final Office Action dated Aug. 25, 2022 for U.S. Appl. No. 16/590,210.

Bargeon, Brittany E., Non-Final Office Action dated Dec. 13, 2021 for U.S. Appl. No. 16/590,210.

Bargeon, Brittany E., Notice of Allowance and Fee(s) Due for U.S. Appl. No. 13/962,213 dated Jul. 25, 2019.

Bargeon, Brittany E., Notice of Allowance and Fee(s) Due dated Sep. 15, 2022 for U.S. Appl. No. 16/590,210.

Bargeon, Brittany E., U.S. Patent and Trademark Office Final Office Action dated Oct. 23, 2015 for U.S. Appl. No. 13/962,213 (24 pages).

Bargeon, Brittany E., U.S. Patent and Trademark Office Non-Final Office Action dated Aug. 14, 2014 for U.S. Appl. No. 13/962,213 (21 pages).

Bargeon, Brittany E., U.S. Patent and Trademark Office Non-Final Office Action dated Jun. 9, 2016 for U.S. Appl. No. 13/962,213 (26 pages).

Bargeon, Brittany E., U.S. Patent and Trademark Office Non-Final Office Action dated Nov. 18, 2016 for U.S. Appl. No. 13/962,213 (22 pages).

Bifolco et al., "Adaptive Scheduling to Facilitate Optimized Distribution of Subscribed Items", U.S. Appl. No. 62/425,191, filed Nov. 22, 2016.

Bifolco et al., "Adaptive Scheduling to Facilitate Optimized Distribution of Subscribed Items," U.S. Appl. No. 15/821,362, filed Nov. 22, 2017.

CTIA's Annual Survey Says US Wireless Providers Handled 3.2 Trillion Megabytes of Data Traffic in 2013 for a 120 Percent Increase Over 2012, Jun. 17, 2014, https://web.archive.org/web/20140723023447/http://www.ctia.org/resource-library/press-releases/archive/ctia-annual-survey-2013.

Eskridge, Cory W., Final Office Action dated Apr. 6, 2021 for U.S. Appl. No. 15/479,230.

Eskridge, Cory W., Final Office Action dated Dec. 15, 2021 for U.S. Appl. No. 15/479,230.

Eskridge, Cory W., Final Office Action dated Feb. 21, 2020 for U.S. Appl. No. 15/479,230.

Eskridge, Cory W., Non-Final Office Action dated Aug. 18, 2020 for U.S. Appl. No. 15/479,230.

Eskridge, Cory W., Notice of Allowance and Fee(s) Due dated Apr. 14, 2022 for U.S. Appl. No. 15/479,230.

Fredrich et al., "Adaptive Scheduling of Electronic Messaging Based on Predictive Consumption of the Sampling of Items via a Networked Computing Platform", U.S. Appl. No. 15/716,486, filed Sep. 26, 2017.

Fredrich et al., "Dynamic Processing of Electronic Messaging Data and Protocols to Automatically Generate Location Predictive Retrieval Using a Networked, Multi-Stack Computing Environment," U.S. Appl. No. 16/046,690, filed Jul. 26, 2018.

Fredrich et al., "Dynamic Processing of Electronic Messaging Data and Protocols to Automatically Generate Location Predictive Retrieval

(56) References Cited

OTHER PUBLICATIONS

Using a Networked, Multi-Stack Computing Environment," U.S. Appl. No. 16/115,474, filed Aug. 28, 2018.
Fredrich et al., "Electronic Messaging to Distribute Items Based on Adaptive Scheduling", U.S. Appl. No. 15/479,230, filed Apr. 4, 2017.
Garg, Yogesh C., Non-Final Office Action dated Nov. 12, 2019 for U.S. Appl. No. 15/821,362.
Garg, Yogesh C., Non-Final Office Action dated Oct. 18, 2021 for U.S. Appl. No. 16/930,825.
Garg, Yogesh C., Notice of Allowance and Fee(s) Due dated Jan. 10, 2022 for U.S. Appl. No. 16/930,825.
Hsu et al., "Smart Pantries for Homes," 2006 IEEE International Conference on Systems, Man and Cybernetics, 2006, pp. 4276-4289, dot: 10.1109/ICSMC.2006.384806, Retrieved May 28, 2022; https://ieeexplore.ieee.org/document/4274571?source=IQplus (Year: 2006).
Kim, Harry C., Notification of Transmittal of the International Search Report and the Written Opinion of the International Searching Authority, or the Declaration for International Application No. PCT/US2018/058053 dated May 7, 2019.
Koester, Michael R., Final Office Action dated Aug. 9, 2022 for U.S. Appl. No. 17/693,341.
Koester, Michael R., Non-Final Office Action dated Jan. 8, 2021 for U.S. Appl. No. 15/716,486.
Koester, Michael R., Non-Final Office Action dated Jun. 23, 2022 for U.S. Appl. No. 16/779,600.
Koester, Michael R., Non-Final Office Action dated Jun. 7, 2022 for U.S. Appl. No. 17/693,341.
Koester, Michael R., Non-Final Office Action dated Oct. 7, 2022 for U.S. Appl. No. 17/365,954.
Koester, Michael R., Notice of Allowance and Fee(s) Due, Examiner Interview Summary and Examiner's Amendment dated Jun. 10, 2021 for U.S. Appl. No. 15/716,486.
Koester, Michael Richard, Final Office Action dated Jun. 5, 2020 for U.S. Appl. No. 15/716,586.
Koester, Michael Richard, Final Office Action dated Sep. 23, 2022 for U.S. Appl. No. 16/779,600.
Koester, Michael Richard, Non-Final Office Action dated Nov. 25, 2019 for U.S. Appl. No. 15/716,486.
Lowry et al., Online Payment Gateways Used to Facilitate E-Commerce Transactions and Improve Risk Management, Jan. 2006, Communications of the Association for Information Systems (CAIS), vol. 17, Article 6, pp. 1-49. (Year: 2006).
Mahone, Kristie A., Final Office Action for U.S. Appl. No. 15/801,002 dated Sep. 28, 2018.
Mahone, Kristie A., Non-Final Office Action for U.S. Appl. No. 15/801,002 dated Mar. 8, 2018.
Mitchell, Nathan A., Final Office Action dated Apr. 6, 2022 for U.S. Appl. No. 16/398,241.
Mitchell, Nathan A., Final Office Action dated Jul. 28, 2021 for U.S. Appl. No. 15/905,764.
Mitchell, Nathan A., Final Office Action dated Jul. 28, 2021 for U.S. Appl. No. 16/398,241.
Mitchell, Nathan A., Non-Final Office Action for U.S. Appl. No. 15/905,764 dated Mar. 18, 2020.
Mitchell, Nathan A., Non-Final Office Action dated Aug. 11, 2022 for U.S. Appl. No. 15/905,764.
Mitchell, Nathan A., Non-Final Office Action dated Dec. 13, 2021 for U.S. Appl. No. 15/905,764.
Mitchell, Nathan A., Non-Final Office Action dated Mar. 23, 2021 for U.S. Appl. No. 16/398,241.
Mitchell, Nathan A., Notice of Allowance and Fee(s) Due dated Aug. 23, 2022 for U.S. Appl. No. 16/398,241.
Mitchell, Nathan A., Notice of Allowance and Fee(s) Due dated Mar. 1, 2019 for U.S. Appl. No. 15/801,002.
Rao, Leena, "Amazon to Add Trash Cans, Dishwashers, Dryers to Smart Reordering Service." Published Aug. 2016. Retrieved from on Feb. 22, 2019.
Ricker, Thomas; "Wanted: An Amazon Fridge That Automatically Reorders Food," Published Jan. 18, 2017; Retrieved From on Mar. 18, 2020.
Ricker, Thomas; "Wanted: An Amazon Fridge That Automatically Reorders Food." Published Jan. 2017. Retrieved from on Feb. 22, 2019.
Stinson, Tanner, "AmazonKitchen DRS", Hackster Project, Published Feb. 5, 2017, https://www.hackster.io/tanner-stinson/amazonkitchen-drs-75fc24?ref=challenge&ref_id=78&offset=9.
Vodnick, Craig, "How Do You Handle Subscription Renewals?", Published Mar. 28, 2011, Cleverbridge Blog, URL: https://www.cleverbridge.com/corporate/how-do-you-handle-subscription-renewals/ (Year: 2011).
Wilder, Andrew H., Non-Final Office Action dated Feb. 9, 2022 for U.S. Appl. No. 16/943,226.
Wilder, Andrew H., Non-Final Office Action dated Nov. 25, 2019 for U.S. Appl. No. 15/801,172.
Wilder, Andrew H., Notice of Allowance and Fee(s) Due dated Oct. 19, 2022 for U.S. Appl. No. 16/943,226.
Wilder, Hunter, Final Office Action dated Jun. 23, 2022 for U.S. Appl. No. 16/943,226.
Wu et al., An Enhanced Recommendation Scheme for Online Grocery Shopping, IEEE 15 International Symposium on Consumer Electronics (ISCE), 2011, pp. 410-415, URL: https://ieeeplore.ieee.org/document/5973860?source=IQplus (Year: 2011).
Zimmerman, Jeffrey P., Final Office Action dated Apr. 15, 2019 for U.S. Appl. No. 16/046,690.
Zimmerman, Jeffrey P., Final Office Action dated Apr. 15, 2019 for U.S. Appl. No. 16/115,474.
Zimmerman, Jeffrey P., Non-Final Office Action for U.S. Appl. No. 16/046,690 dated Dec. 10, 2018.
Zimmerman, Jeffrey P., Non-Final Office Action for U.S. Appl. No. 16/115,474 dated Dec. 6, 2018.
Zimmerman, Jeffrey P., Non-Final Office Action dated Jul. 15, 2019 for U.S. Appl. No. 16/115,474.
Zimmerman, Jeffrey P., Non-Final Office Action dated Jun. 20, 2019 for U.S. Appl. No. 15/479,230.
Zimmerman, Jeffrey P., Non-Final Office Action dated Jun. 20, 2019 for U.S. Appl. No. 16/046,690.
Mitchell, Nathan A., Final Office Action dated Apr. 6, 2022 for U.S. Appl. No. 15/905,764.

\* cited by examiner

ADAPTIVE SCHEDULING TO FACILITATE OPTIMIZED DISTRIBUTION OF SUBSCRIBED ITEMS

CROSS-REFERENCE TO APPLICATIONS

This application is a continuation application of U.S. patent application Ser. No. 16/930,825, filed Jul. 16, 2020 and titled, "ADAPTIVE SCHEDULING TO FACILITATE OPTIMIZED DISTRIBUTION OF SUBSCRIBED ITEMS," U.S. patent application Ser. No. 16/930,825 is a continuation application of U.S. patent application Ser. No. 15/821,362, filed on Nov. 22, 2017, now U.S. Pat. No. 10,719,860 and titled "ADAPTIVE SCHEDULING TO FACILITATE OPTIMIZED DISTRIBUTION OF SUBSCRIBED ITEMS," U.S. patent application Ser. No. 15/821,362 claims the benefit of U.S. Provisional Patent Application No. 62/425,191, filed on Nov. 22, 2016 and titled "ADAPTIVE SCHEDULING TO FACILITATE OPTIMIZED DISTRIBUTION OF SUBSCRIBED ITEMS," all of which are herein incorporated by reference in their entirety for all purposes. This application also incorporates by reference U.S. Nonprovisional patent application Ser. No. 15/801,002, filed on Nov. 1, 2017 and titled "CONSUMABLE USAGE SENSORS AND APPLICATIONS TO FACILITATE AUTOMATED REPLENISHMENT OF CONSUMABLES VIA AN ADAPTIVE DISTRIBUTION PLATFORM," U.S. patent application Ser. No. 15/479,230, filed on Apr. 4, 2017 and titled "ELECTRONIC MESSAGING TO DISTRIBUTE ITEMS BASED ON ADAPTIVE SCHEDULING," and U.S. patent application Ser. No. 15/716,486, filed on Sep. 26, 2017 and titled "ADAPTIVE SCHEDULING OF ELECTRONIC MESSAGING BASED ON PREDICTIVE CONSUMPTION OF THE SAMPLING OF ITEMS VIA A NETWORKED COMPUTING PLATFORM," all of which are herein incorporated by reference in their entirety for all purposes.

FIELD

Various embodiments relate generally to data science and data analysis, computer software and systems, and control systems to provide an interface, and, more specifically, to a computing and data storage platform that implements specialized logic to facilitate adaptive scheduling automatically to optimally distribute items, such as shipping an item in accordance with an adapted frequency for a subscription.

BACKGROUND

Advances in computing hardware and software, as well as computing networks and network services, have bolstered growth of Internet-based shopping and delivery. Online shopping, in turn, has fostered the use of "subscription"-based delivery computing services with an aim to provide convenience to consumers. In particular, a user becomes a subscriber when associated with a subscriber account, which is typically implemented on a remote server for a particular retailer. In exchange for electronic payment, which is typically performed automatically, a retailer ships a specific product (or provides access to a certain service) at periodic times, such as every three (3) months. With conventional online subscription-based ordering, consumers need not plan to reorder to conveniently replenish supplies of a product.

However, conventional approaches to provide subscription-based order fulfillment, while functional, suffer a number of other drawbacks. Generally, traditional subscription-based ordering has evolved from periodic types of payment, regardless of the use of products or services. For example, a number of retail subscription models originate from those similar to DVD delivery subscription services and digital download services, which typically provide access to products as "rentals." Thus, access is independent relative to consumption or usage. These types of subscription models, therefore, are generally not well-suited for application to non-periodic consumption rates or depletable products (e.g., product usage depletes some or all of the product).

Further, traditional subscription-based ordering relies on a user to manually determine a quantity and a time period between replenishing shipments, after which the quantity is shipped after each time period elapses. Essentially, subscribers receive products on "auto-pilot." The different rates of usage of different subscribers generally are not well-reflected in the shipment periods with which subscriptions are established. One prevalent consequence of mismatches between time periods for delivering subscribed products and consumption rates by consumers is that, over time, the supply of a subscribed item is either over-delivered or under-delivered. An oversupply of subscribed product typically degrades consumer experience due to a number of reasons. For example, subscribers may believe that a retailer is "over-billing" the customer for unneeded products. Similarly, an under-supply of subscribed product may give to frustration and friction that an expected subscribed product is scarce or unavailable.

Online retailers and merchants may experience similar consequences due to mismatching of delivery times and consumption rates, but at an aggregate level of subscribers. In the aggregate, the mismatches may cause either overstocking or understocking of inventory of the online retailers and merchants. Fluctuations in inventory may cause non-beneficial consumption of resources and time. Note, too, that the computing systems of online retailers and merchants are not well-adapted to address the above-described mismatching phenomena when ordering, shipping, and performing inventory management.

In some conventional approaches, online retailers and merchants may aim to set delivery rates of subscribed products to optimize conversion rates (e.g., rates at which a user performs an action after vising a web page), revenue, or other metrics that are designed for online retailers and merchants rather than customers. Thus, some conventional metrics are not well-suited to correlate accurately how a product or service is consumed or depleted.

Thus, what is needed is a solution for facilitating techniques to adaptively schedule items for automatic distribution of items, without the limitations of conventional techniques.

BRIEF DESCRIPTION OF THE DRAWINGS

Various embodiments or examples ("examples") of the invention are disclosed in the following detailed description and the accompanying drawings.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims, and numerous alternatives, modifications, and equivalents thereof. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1A:
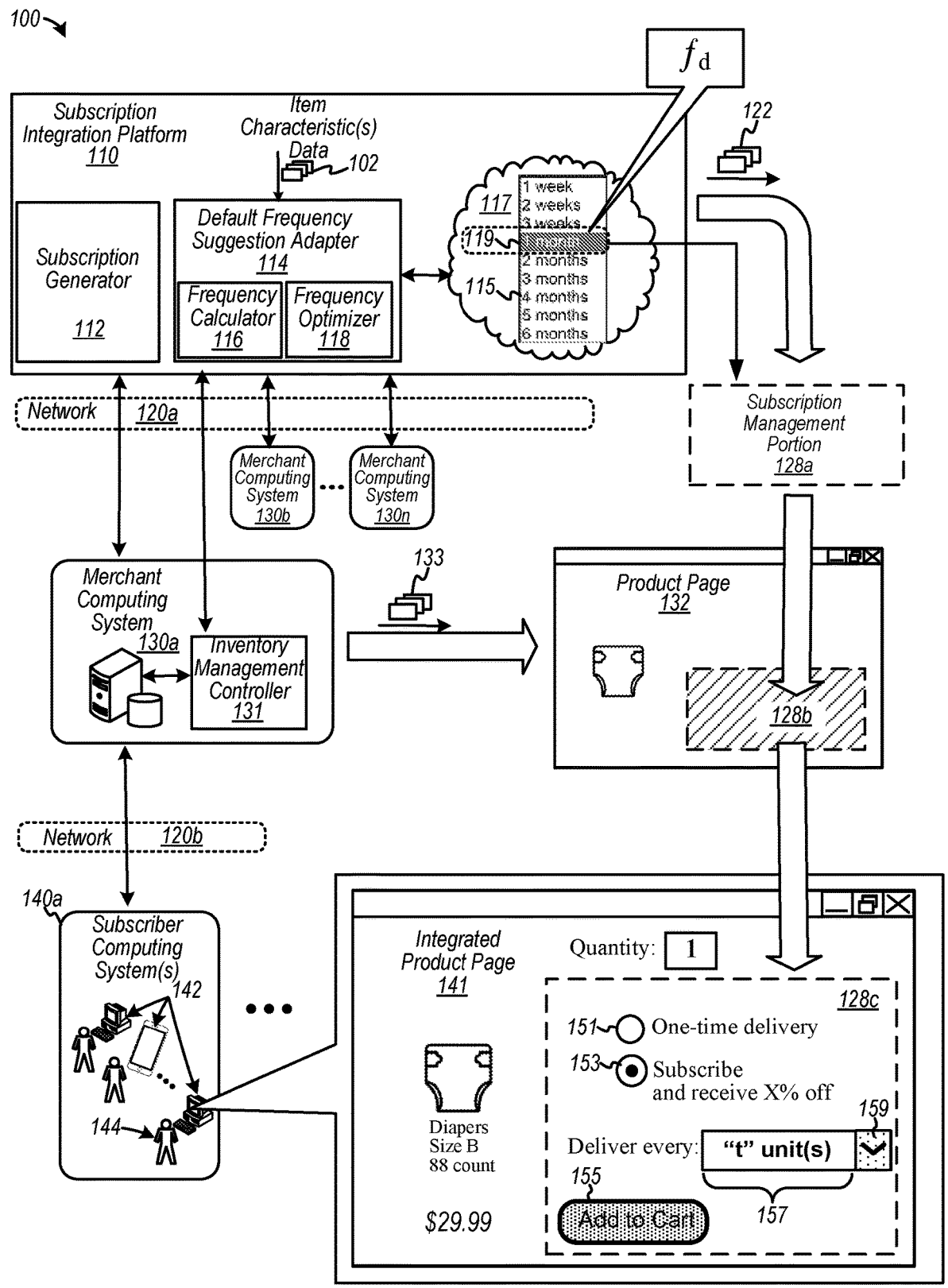
FIG. 1A is a diagram depicting a subscription integration platform, according to some embodiments.

FIG. 1A is a diagram depicting a subscription integration platform, according to some embodiments. Diagram 100 depicts an example of subscription integration platform 110 that may be configured to facilitate shipment scheduling of goods or services based on subscriptions generated in a network of computing devices, whereby a subscription enables a user to order an item, via the Internet or any other network, in accordance with an adaptive schedule over multiple deliveries or shipments. As shown, subscription integration platform may include a subscription generator 112 and a default frequency suggestion adapter 114. An "item," as used in at least some examples, may refer to either a product or service, or both, for which a subscription may be implemented, managed, and adapted, according to various embodiments.

Subscription generator 112 may be configured to facilitate "adaptive" subscription services via a computing system platform for multiple online or Internet-based retailers and service providers, both of which may be referred to as merchants. In this example, a merchant may be associated with a corresponding one of merchant computing systems 130a, 130b, or 130n that includes one or more computing devices (e.g., processors, servers, etc.), one or more memory storage devices (e.g., databases, data stores, etc.), and one or more applications (e.g., executable instructions for performing adaptive subscription services, etc.). Examples of merchant computing systems 130a, 130b, or 130n may be implemented by WALMART™, AMAZON™, and L'OCCITANE™, respectively, or any other online merchant. Subscription generator 112 can be configured to generate electronic offers and electronic orders to fulfill accepted offers. Subscription generator 112 also can be configured to distribute subscribed items in accordance to one or more default frequencies, any of which may be adaptively derived to optimize delivery of items associated with subscriptions.

Default frequency suggestion adapter 114 may be configured to determine a frequency relative to, for example, a number of frequencies, and further configured to adapt the frequency to derive a default frequency. According to some examples, default frequency suggestion adapter 114 may be configured to adapt a rate at which an item may be scheduled for delivery to implement at least a portion of the adaptive nature of the subscription services generated by subscription generator 112. Therefore, default frequency suggestion adapter 114 may be configured to generate a default frequency, a representation of which may be presented via a user interface to a prospective consumer in an electronic offer. In various examples, the default frequency presented to a consumer is a frequency adapted to one or more contextual characteristics, including item characteristics, that may substantially conform a shipment rate of an item to a usage rate of the item by the consumer. An example of a subscription generator 112, or a portion thereof, may operate in accordance to U.S. patent application Ser. No. 13/962, 213. According to some embodiments, default frequency suggestion adapter 114, or any of its elemental structures and/or functionalities need not be implemented in association with a subscription. Therefore, a default frequency may be generated independent from a subscription and may be conveyed for presentation to a potential consumer or purchaser in any medium, such as in any electronic message format (e.g., emails, text messages, etc.) or non-electronic message format.

Further to diagram 100, default frequency suggestion adapter 114 is shown to include a frequency calculator 116 and a frequency optimizer 118, according to some examples. According to various embodiments, default frequency suggestion adapter 114 may be configured to receive any number of subsets of data, at least some subsets each representing an item characteristic 102 of any number of item characteristic(s) data 102. Based on item characteristic(s) data 102, default frequency suggestion adapter 114 may be configured to determine a frequency in which an item may be scheduled for distribution to, for example, a geographic location associated with a subscriber. Alternatively, a geographic location may be associated with one or more of a subscriber account, a subscriber computing system associated with the subscriber account, a merchant, an inventory storage facility, among other entities. In some embodiments, default frequency suggestion adapter 114 may be configured to determine a default frequency with which to specify a rate at which an item may be shipped in accordance with a subscription. In the example shown, default frequency suggestion adapter 114 may determine a subset of frequencies 117. As shown, subset of frequencies can include a group of individual frequencies 115 including 1 week, 2 weeks, 3 weeks, 1 month (i.e., 4 weeks), 2 months, 3 months, 4 months, etc., with each frequency indicating a rate at which an item may be shipped (e.g., to a location at which a subscriber resides). Default frequency suggestion adapter 114 also may be configured to select a frequency 119 as a default frequency ($f_d$), which may be an optimal frequency, in some examples, that may satisfy one or more metrics indicative of optimal distribution of items.

Frequency calculator 116 is configured to receive data representing item characteristics data 102, according to some embodiments. Further, frequency calculator 116 may be configured to determine (e.g., identify, calculate, derive, etc.) one or more frequencies based on one or more item characteristics 102, or combinations thereof (e.g., based on derived item characteristics). In at least one example, frequency calculator 116 may be configured to operate on data representing an item characteristic 102, which may be derived or calculated based on one or more other item characteristics 102. Examples of item characteristics data 102 may include, but are not limited to, data representing one or more of an item, such as characteristics describing a product, as well as a product type or any other product characteristic, a service, as well as a service type or any other service characteristic. In some examples, item characteristics data 102 may include, but are not limited to, shipment rate-related data, such as a number of subscriptions for an item, a number of shipments for an items, etc. Item characteristics data 102 may include any other identifiable data that be used to calculate a frequency, such as a default frequency (e.g., an optimal frequency). For example, a metric with which to determine a default frequency may be, for example, an optimum frequency that may be derived based on other item characteristics of the item or other item characteristics of other items. A metric, in some examples, may represent a threshold value or a range of values against which one or more item characteristics may be compared to determine a default frequency, according to some embodiments.

In one example, a derived item characteristic may be derived by calculating a value based on a number of one or more shipments relative to one or more subscriptions. As such, a calculated number of shipments with respect to the number of subscriptions may be referred to as an "SPS" metric (i.e., shipment(s) per subscription metric). Accordingly, frequency calculator 116 may be configured to calculate an SPS value for each of a subset of frequencies 117. Thus, a value of SPS may be calculated for each frequency 115, whereby the values of SPS may be analyzed to determine an optimal frequency, according to some embodiments.

Frequency optimizer 118 is configured to receive data representing frequency-related data from frequency calculator 116, as well as item characteristics data 102, to determine one or more default frequencies, according to some embodiments. In at least one example, frequency optimizer 118 may be configured to determine an optimal default frequency with which to establish a frequency to deliver an item (e.g., for a particular subscription). In some implementations in which values of SPS are calculated by frequency calculator 116 for a subset of frequencies 117, frequency optimizer 118 may identify a greatest value of an SPS to indicate that an associated frequency may be used as a default frequency. According to some embodiments, default frequency suggestion adapter 114 and/or frequency optimizer 118 may be configured to monitor values of one or more item characteristics and update the one or more values of the item characteristics. As such, frequency optimizer 118 may be configured to dynamically determine the default frequency with which to associate a subscription for a specific item, among other parameters. Default frequency suggestion adapter 114 may operate periodically, aperiodically, in real-time, substantially in real-time, at any time, etc., to generate a default frequency.

Subscription integration platform 110 is shown to be coupled via network 120a to any number of merchant computing systems 130a to 130n. Hence, subscription integration platform 110 may be configured to service any aspect of merchant computing systems 130a to 130n. Further to diagram 100, merchant computing systems 130a to 130n may be coupled via network 120b to any number of subscriber computer systems 140a, each of which is shown to include a subscriber computing system 142 and a corresponding user 144. Note that any number of merchant computing systems 130b to 130n may be associated with any number of subscriber computer systems 140a, but are not shown.

Diagram 100 of FIG. 1A further depicts subscription integration platform 110 that can be configured to generate data representing a subscription management portion 128a, which may include data 122 that represents a default frequency 119. Subscription management portion 128a may include executable instructions and/or formatted data (e.g., data formatted with respect to XML, etc.) to represent a subscription offer, which may include a default frequency, according to various embodiments. Formatted data may also include a file formatted to include content (e.g., formatted as HTML) and/or executable instructions (e.g., functionality formatted as script, such as JavaScript), among other examples of presenting data generated herein. Regardless, subscription integration platform 110 may be configured to generate subscription management portion 128a for injection into portion 128b, which is a portion of product page 132. Merchant computing system 130a to 130n each may be configured to generate formatted data and/or executable code (e.g., via an API or other software modules) to provide a product page 132 that offers, for example, an item for sale online with respect to terms based on a portion 128b. As shown, portion 128a may be injected into portion 128b of product page 132 to form an integrated product page 141. According to some embodiments, merchant computing system 130a, as well as other computing systems, may be configured to generate data 133 to generate product page 132 for combination with subscription management portion 128a in the data portion 128b. Note, too, that any number of merchant computing systems 130a to 130n may be configured to produce corresponding product pages 132 to form any number of integrated product pages 141, which, in turn, may be presented to a specific subscriber computing system 142 and/or subscriber 144.

Further to FIG. 1A, subscription integration platform 110 may be configured to generate integrated product page 141 that includes portion 128c via computing system 142 associated with user 144. As shown, an integrated portion 128c may include a portion of the user interface in which to accept input signals. For example, integrated portion 128c may be configured to generate a user input 151 to accept data signals that indicate whether the item may be scheduled as a one-time delivery, and a user input 153 to accept data signals that indicate whether an item (e.g., diapers) is selected and scheduled as part of a subscription. As shown, an item may be selected via a portion 128c and may be responsive to, for example, either user input 151 indicating a one-time delivery or user input 153 indicating a subscription. As shown, integrated portion 128c is shown to further include a default frequency 157, for example, in terms of "t" units of time for a subscribed item. In this example, a unit may be any length of time (e.g., a day, a week, a month, etc.) and "t" may represent a value for which a subscription repeats. According to various embodiments, user input 159 may be configured to display a subset of frequencies 117, with a default frequency 157 being presented. User input 155 is configured to confirm the selection and "add" to a cart the selection.

In some embodiments, a merchant computing system, such as merchant computing system 130a, may include an inventory management controller 131, which may be implemented as a known inventory management software application that may be adapted receive an aggregate number of default frequencies to refine, for example, amounts of inventory at a storage facility prior to dispatch or subscription fulfillment. Subscription integration platform 110 may be configured to provide a subset of frequencies 117 and/or an optimal frequency 119 to inventory management controller 131. Accordingly, inventory management controller 131 may be configured to determine an inventory amount (e.g., dynamically) based on an identified frequency or one of a number of default frequencies. Therefore, a merchant associated with merchant computing system 130a may be configured to optimally determine an amount or quantity of items for subscription fulfillment in an inventory based on, for example, a default frequency 119.

In view of the foregoing, the structures and/or functionalities depicted in FIG. 1A may illustrate an example of adaptive scheduling to automatically facilitate the optimal distribution of items, such as shipping an item an adapted frequency for a subscription in accordance with various embodiments. According to some embodiments, subscription integration platform 110 may be configured to determine a default frequency 119 as an optimal frequency with which to ship items. In various examples, multiple merchant computing systems 130a to 130n may be configured to provide data from which to determine a default frequency 157. Note, too, user interface portion 128c may be configured to present a default frequency, which may be an optimal frequency with which to ship or deliver an item to a subscriber at a particular location (e.g., geographic location). According to some embodiments, a default frequency may be implemented by an inventory management controller 131 to manage an amount of inventory optimally across an aggregate number of subscribers 144. According to some embodiments, subscription integration platform 110 is configured to generate formatting data (e.g., XML, JSON, etc.) that may represent or include data representing a frequency with which to integrate to form a hybrid webpage of a merchant computing system. Thus, subscription management portion 128a may be injected into portion 128b (e.g., seamlessly) so that integrated product page 141 may be presented to a user, whereby the user need not discern subscription management portion 128a originates from other than merchant 130a. As such, subscription integration platform 110 may be configured to generate hybrid web pages, such as integrated product page 141, whereby multiple entities may be configured to collaborate to facilitate optimal delivery of items among disparate entities from which at least a portion of a service is implemented. Subscription integration platform 110 may provide subscription services to multiple entities, thereby reducing resources that otherwise may be needed to perform subscription management. In some examples, an adapted frequency may be used to determine one or more delivery characteristics, such as a rate of delivery based on, for example, consumption or depletion. A delivery characteristic may describe whether an item is delivered as one-time delivery or as a subscribed item, with variable periods of times between replenishment. A delivery characteristic may describe a variable scheduled shipment of an item based on, for example, usage or consumption. In various examples, an adapted frequency may be determined based on any of a number of item characteristics, which, in turn, may determine a delivery characteristic.

Figure 1B:
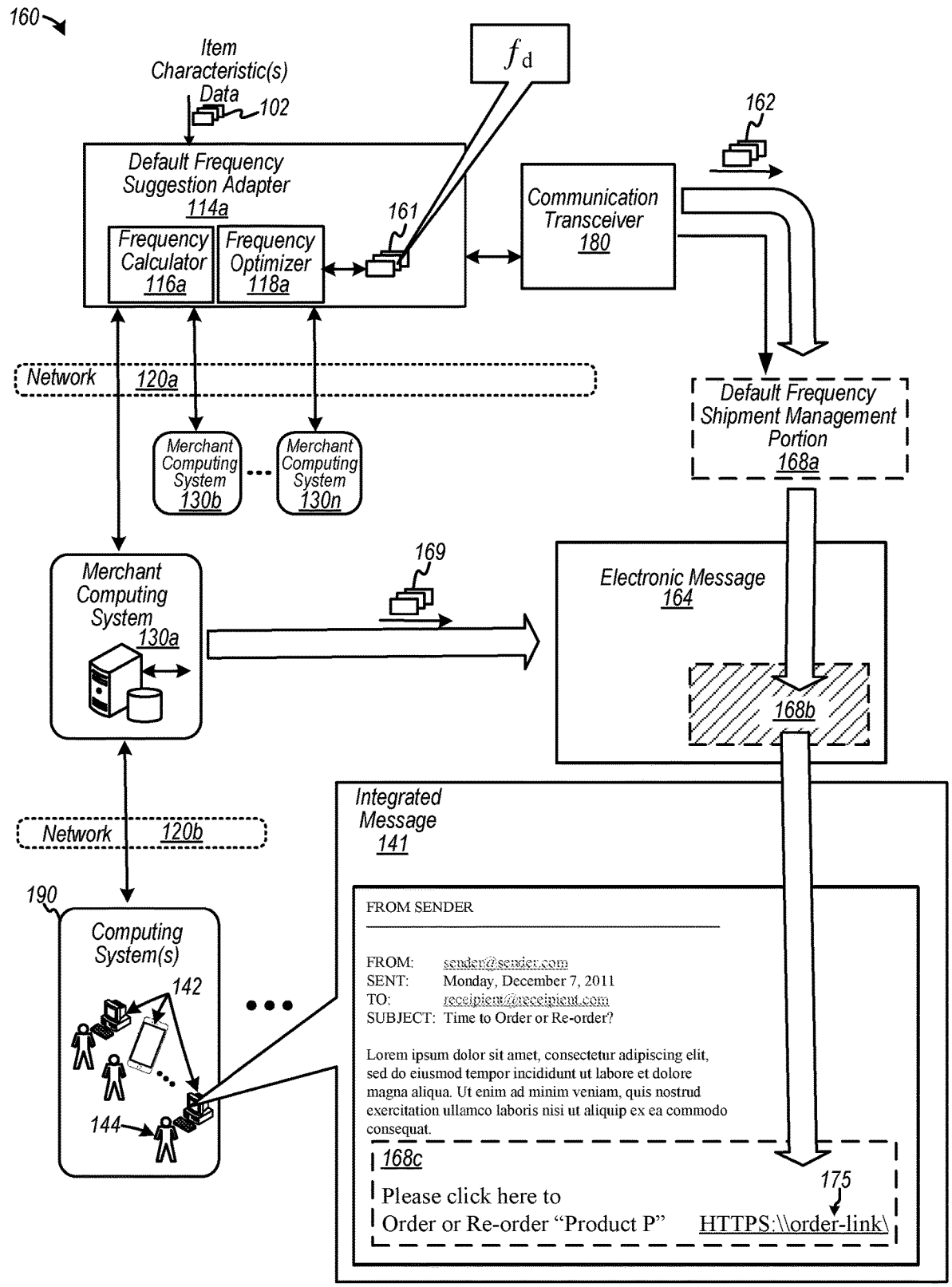
FIG. 1B is a diagram depicting an example of a default frequency suggestion adapter configured for implementation in any form of communication, according to some embodiments.

FIG. 1B is a diagram depicting an example of a default frequency suggestion adapter configured for implementation with any form of communication, according to some embodiments. Diagram 160 depicts an example of a default frequency suggestion adapter 114a configured to operate independent of a subscription integration platform or a subscription process. Also, default frequency suggestion adapter 114a may be configured to be implemented to generate offers (e.g., electronic offers) in any medium to provide a suggestion to a consumer 144 to order or re-order an item in accordance with a default frequency 161. Hence, default frequency suggestion adapter 114a may be configured to facilitate shipment scheduling of goods or services based on predicted frequencies of shipment or delivery to anticipate an optimal time to present an offer to a user (or potential user). In some examples, a default frequency may be generated as a predicted frequency of one or more, for example, subsequently-purchased items based on one or more item characteristics in data 102. The one or more subsequently-items may include an initial or original order and/or shipment. In some cases, the default frequency may be, but need not be, based on usage of an item in a predicted depletion of the item based on usage. According to some examples, elements depicted in diagram 160 of FIG. 1B may include structures and/or functions as similarly-named or similarly-numbered elements depicted in other drawings.

Diagram 160 further includes a communication transceiver 180 that may be configured to receive at least a default frequency 161 (e.g., a predicted ship rate or date) for a particular item from default frequency suggestion adapter 114a communication transceiver 180 may be any known hardware or software (or combination thereof) device or computing system that formats data to include default frequency 161 and, for example, product information. The formatted data may be used to construct default frequency shipment management portion 168a, which may be integrated in any medium or form of communication (e.g., visual, aural, etc.) in which data may be conveyed.

According to some embodiments, merchant computing system 130a, as well as other computing systems, may be configured to generate data 169 to generate electronic message 164 for combination with default frequency shipment management portion 168a in a data portion 168b. Data portion 168b is visually depicted in FIG. 1B as a portion (e.g., an "empty" portion) in which data default frequency shipment management portion 168a may be injected. Note, too, that any number of merchant computing systems 130a to 130n may be configured to produce corresponding electronic messages 164 to form any number of integrated messages 141, which, in turn, may be presented to a specific computing system 142 and/or subscriber 144 in a subset 190 of computing systems.

In the example shown, integrated message 141 may be implemented as an electronic mail (e.g., email) message in which a portion 168c includes an offer to either ordering item or reorder an item by, for example, activating a link 175. An example of link 175 may be a hyperlink to either default frequency suggestion adapter 114a or merchant computing system 130a, which, when activated, may cause the item to ship in accordance with the default frequency and/or predicted date of delivery. In this example, communication transceiver 180 may be configured as an email server implemented in accordance with various known email computing structures and/or processes. The link 175 may be directed to a web server or any other server configured to cause ordering and shipping of an item associated with an activated link 175.

Note that integrated message 141 may be implemented as any electronic message, including text messages or any other electronic format. In some cases, integrated message 141 may be an automated telephone call including an audio portion that includes instructions to ask the callee whether to reorder a product by, for example, pressing a number on a keypad of a phone. The audio portion may include information similar to that described to that associated with portion 168c. According to some examples, integrated message 141 may be a non-electronic message, such as a direct mail message (e.g., via U.S. Postal Service) in which merchant computing system 130 may receive data representing default frequency shipment management portion 168a for integrating printing a mailing message 164 to form a tangible integrated message 141. The above-described examples of FIG. 1B are examples and are not intended to be limiting. Thus, any number of various implementations for integrated message 141 is within the scope of one or more various embodiments.

Figure 2:
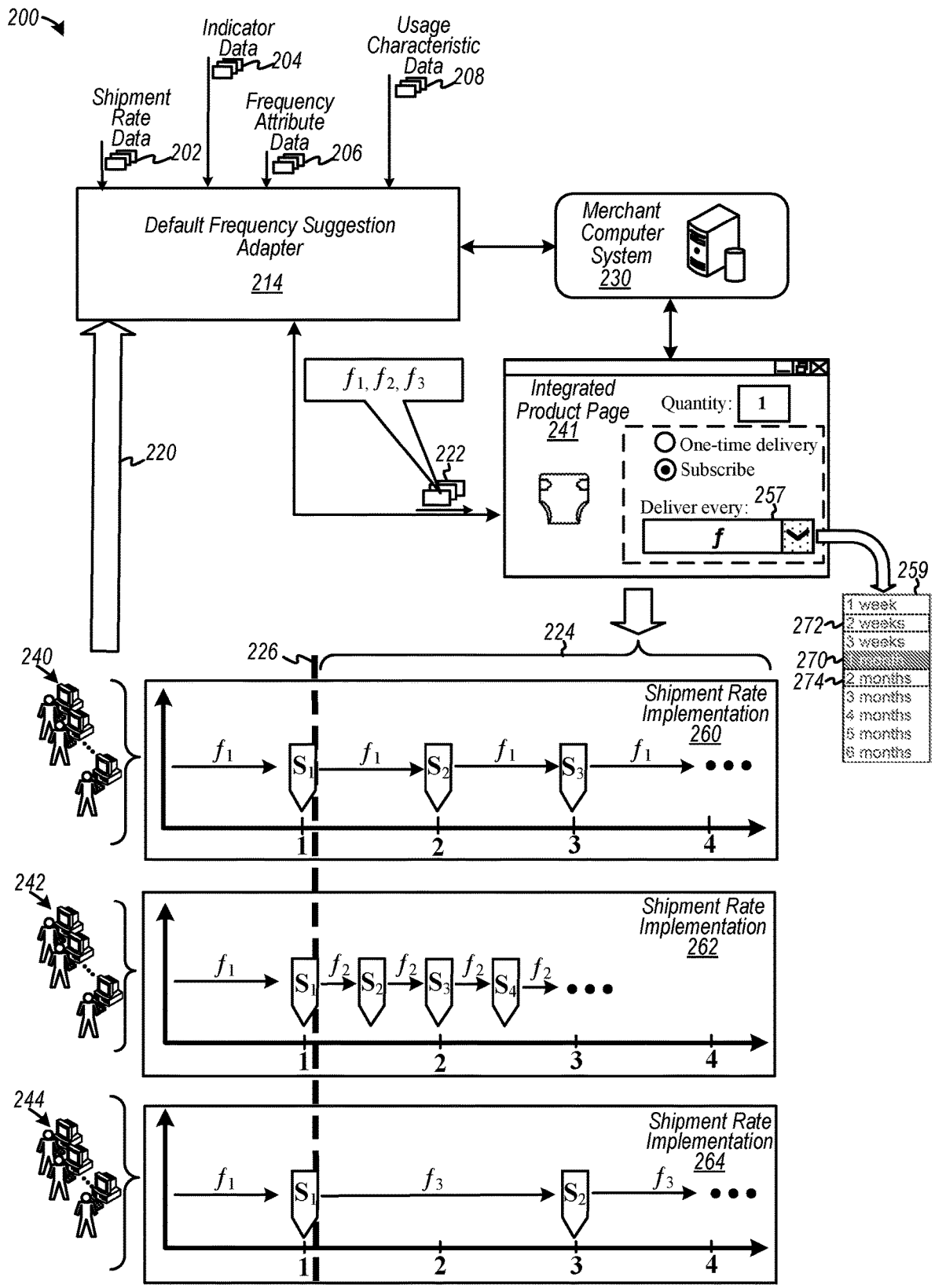
FIG. 2 is a diagram depicting an example of operation of a default frequency suggestion adapter, according to some embodiments.

FIG. 2 is a diagram depicting an example of operation of a default frequency suggestion adapter, according to some embodiments. As shown, diagram 200 includes a default frequency suggestion adapter 214 coupled electronically to a merchant computer system 230 to generate an integrated product page 241. According to various embodiments, default frequency suggestion adapter 214 may be configured to generate data 222 representing one or more frequencies, such as $f_1$, $f_2$, and $f_3$, among others, as default frequencies. In some examples, default frequency suggestion adapter 214 may be configured to determine a frequency, such as $f_1$, $f_2$, and $f_3$, among others, to provide an optimal shipment rate, for at least a particular application or context. Note that a frequency determined by default frequency suggestion adapter 214 may be an example of a frequency with which default frequency suggestion adapter 214 operates and presented to a subscriber as default frequency ("f") 257. Default frequency suggestion adapter 214 may operate to adapt one or more frequencies to form adapted default frequencies $f_1$, $f_2$, and $f_3$, each of which may be adapted or customized based on item characteristics for a subscriber in any of the different subsets of subscribers 240 to 244.

According to some embodiments, default frequency suggestion adapter 214 may be configured to receive and/or determine data for one or more item characteristics that may include, but are not limited to, data representing one or more characteristics of an item, shipment rate-related data 202, indicator-related data 204, frequency attribute-related data 206, and usage-related data 208, and the like. Note that data 202, 204, 206, and 208 may be referred to as examples of item characteristics, according to various examples. Examples of some item characteristics may include a product or product type, a service or service type, etc. Examples of shipment rate-related data may include a number of subscriptions, a number of shipments, etc. Examples of indicator-related data may include data representing items characteristics that may be correlatable to, for example, shipment rate-related data (e.g., a "take rate," a "cancellation rate," etc., or any other data type), which, in turn, may be used to derive a default frequency. The term "take rate" may include data representing a rate at which subscribers "take" or implement a presented frequency as a default frequency, according to some examples. The term "cancellation rate" may include data representing a rate at which subscribers "cancel" a subscription (e.g., based on, for example, frustrations of over-supplied or under-supplied amounts), according to some examples. Examples of frequency attribute-related data may include data representing attributes of other items (e.g., Universal Product Code ("UPC") data, stock keeping unit ("SKU") data, etc. for the same or similar items, or complementary and different items) that may be correlatable to that of a particular item of interest, whereby the attributes of other items can be used to derive a default frequency for the particular item. To illustrate, consider that a default frequency of salt may be used for pepper, and a default frequency of mustard may be used for ketchup as pepper and ketchup are complementary products that may subscribed at similar times or rates of consumption and/or depletion. Examples of usage-related data may include data representing attributes specifying contextual-related information associated with an item, such as, but not limited to, user-related characteristics, such as demographic information, purchasing-related data (e.g., purchase patterns), and the like. In some cases, usage-related data may include attributes describing items historically purchased by a user (e.g., patterns of a parent), as well as related associated users (e.g., patterns of a grandparent), and a subpopulation or a population of which a user belongs.

According to some embodiments, a group 240 of subscribers, a group 242 of subscribers, and a group 244 of subscribers may be associated with data relevant to default frequency suggestion adapter 214, whereby each group 240 to 244, or the like, may be configured to implement or receive information/data relating default frequencies for subscription offers and orders. According to some examples, each group 240 to 244 may be associated with attributes or any other characteristics that may be correlated with other attributes, characteristics, or features, such as a characteristic for an item. Default frequency suggestion adapter 214 may correlate various subsets of characteristics against other subsets of characteristics to form default frequencies, according to various examples.

To illustrate, consider that default frequency suggestion adapter 214 may generate a default frequency, such as $f_1$, for shipment rate implementation 260 for group 240 of subscribers, whereas default frequency suggestion adapter 214 may generate another frequency, such as $f_2$, for group 242 of subscribers. Subscribed items for group 242 are shown to be scheduled for delivery in accordance with $f_2$ of shipment rate implementation 262. Further, default frequency suggestion adapter 214 may generate yet another default frequency, such as $f_3$, to schedule a shipment to subscribers in group 244. Subscribed items may be scheduled for delivery to group 244 according to shipment rate implementation 264.

According to various examples, integrated product page 241 may present default frequency ("$f_1$") 257 to subscribers of group 240 based on one or more item characteristics. In this example, default frequency ("$f_1$") 270 as frequency 257 is depicted a "one month" between scheduled shipments (e.g., S1, S2, S3, etc.). By contrast, integrated product page 241 may present default frequency ("$f_2$") as frequency 257 to subscribers of group 242 based on one or more item characteristics. In this example, default frequency ("$f_2$") 272, as frequency 257, is depicted a "one-half month" (e.g., 2 weeks) between scheduled shipments (e.g., S1, S2, S3, etc.). Further, integrated product page 241 may present default frequency ("$f_3$") as frequency 257 to subscribers of group 244 based any number of item characteristics. In this example, default frequency ("$f_3$") 274, as frequency 257, is depicted a "two months" between scheduled shipments (e.g., S1, S2, S3, etc.).

Figure 3:
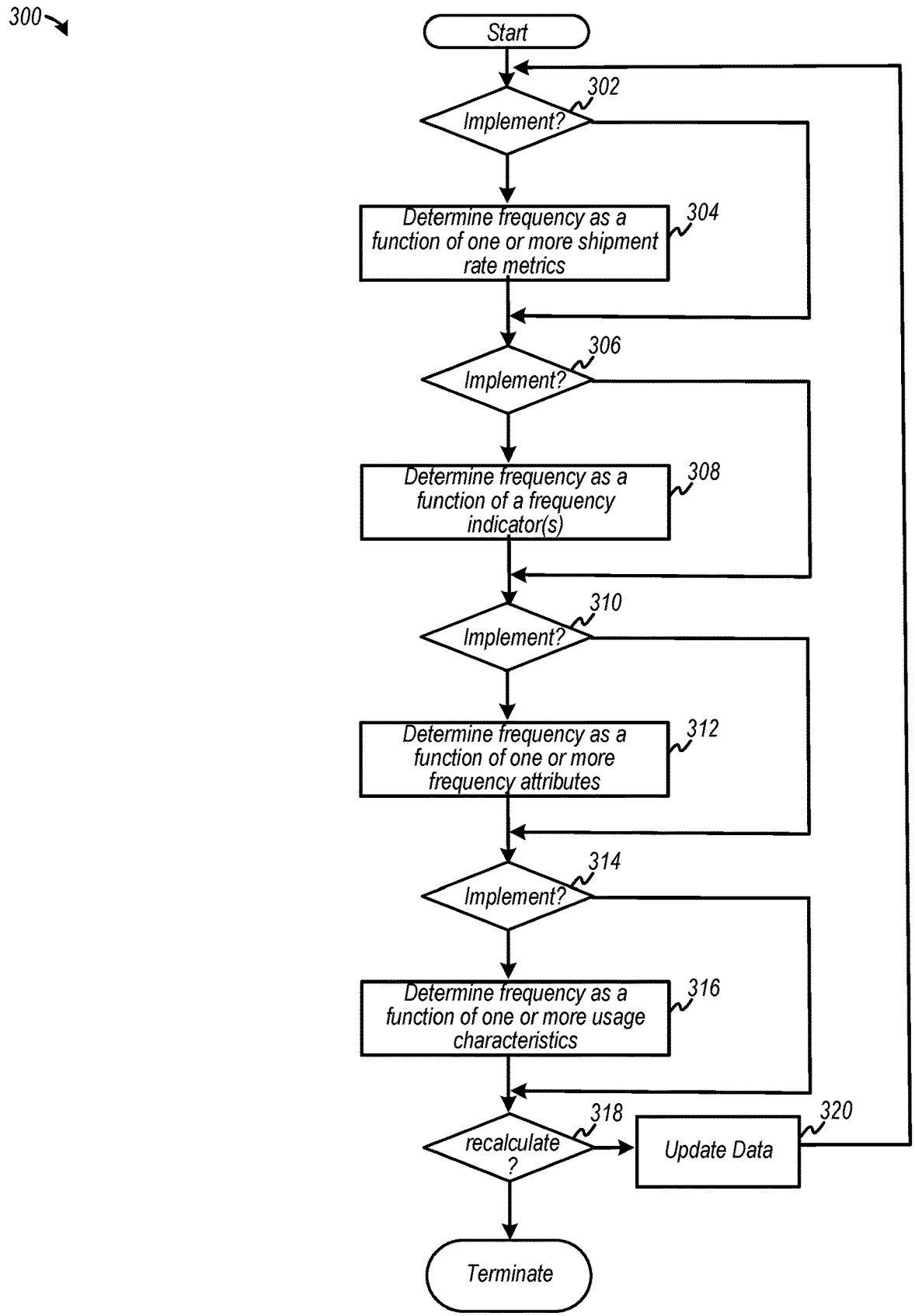
FIG. 3 is a diagram depicting a flow chart to perform an operation of an adaptive scheduling system, according to some embodiments.

FIG. 3 is a diagram depicting a flow chart to perform an operation of an adaptive scheduling system, according to some embodiments. Diagram 300 depicts a flow 300 as an example. Note that 302, 306, 310, 314, among others, may be points at which to determine whether to implement one or more features of the various embodiments. Thus, any of 304, 308, 312, and 316, or any combination thereof, may be implemented or omitted in operation of an adaptive scheduling system. Any of 304, 308, 312, and 316 may be implemented seriously or in parallel.

Flow 300 may begin at 302 to determine whether to implement values determined at 304. At 304, a frequency may be determined as a function of one or more shipment rate metrics. According to at least one embodiment, a frequency or shipment rate with which to deliver an item may be determined as set forth herein as 304. An example of a shipment rate metric may include a shipment-to-subscription ("SPS") metric. In some implementations, flow 300 may further pass to 308 to determine a default frequency, for example, as a function of one or more frequency indicators. In some cases, a frequency indicator may be a "take rate," a "cancellation rate," or the like, which may be correlated to a default frequency. Flow 300 then may transition to 312, at which a frequency may be determined as a function of one or more frequency attributes. Examples of frequency attributes include, but are not limited to, data associated with Universal Product Codes ("UPCs"), stock keeping units ("SKUs"), and the like for the same or similar items, as well as for complementary and different items. At 316, a default frequency may be determined as a function of one or more usage characteristics. Examples of usage characteristics include one or more attributes that may specify contextual-related information associated with an item, such as demographic information, purchasing-related data (e.g., purchase patterns, including a history of purchases), and the like. At 318, flow 300 facilitate a determination whether to recalculate a default frequency to dynamically adapt one or more frequencies to form a default frequency. The dynamically-generated default frequency may be determined and/or calculated continuously or in real-time updates at 320. As such, flow 300 may repeat in real-time and/or continuously (or at any rate) to determine a value that may be calculated or recalculated at 320.

Figure 4:
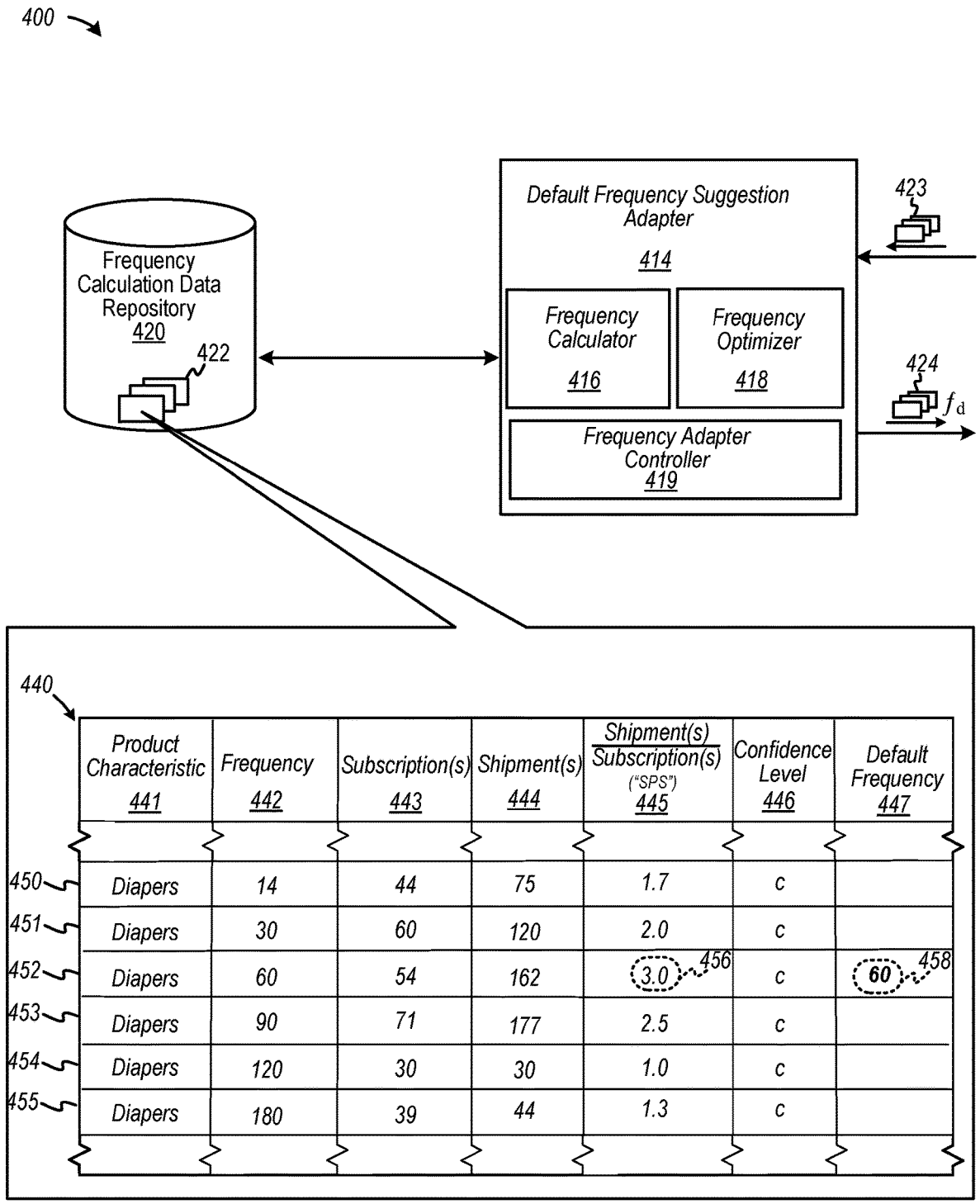
FIG. 4 is a diagram depicting a default frequency suggestion adapter configured to determine a default frequency based on a metric, according to some examples.

FIG. 4 is a diagram depicting a default frequency suggestion adapter configured to determine a default frequency based on a metric, according to some examples. Diagram 400 includes a default frequency suggestion adapter 414, which is shown to include a frequency calculator 416, a frequency optimizer 418, and a frequency adapter controller 419. Frequency adapter controller 419 may include logic configured to, for example, control the determination and/or derivation of data 424 representing one or more default frequencies dynamically in real-time (or substantially in real-time). Also, frequency adapter controller 419 may be configured to control the reception of data 423, which may include data representing any number of item characteristics. Diagram 400 also includes a frequency calculation data repository 420 that may be configured to store data 422, which may be generated and analyzed by default frequency suggestion adapter 414. Diagram 400 also depicts an arrangement of the data 440 as a data structure to maintain data for default frequency generation. Data 440 may include, for example, data 443 representing a number of subscriptions and data 444 representing a number of shipments. Data 443 and 444 may be received into default frequency suggestion adapter 414 as data 423. According to some examples, elements depicted in diagram 400 of FIG. 4 may include structures and/or functions as similarly-named or similarly-numbered elements depicted in other drawings.

Data structure 440 is shown to store data representing one or more product characteristics 441 (e.g., a product type, such as "diapers"), data representing one or more frequencies 442, data representing one or more subscription quantities 443, data representing one or more shipment quantities 444, data representing one or more metrics 445, data representing one or more confidence levels 446 (e.g., to indicate a likelihood of using), and one or more default frequencies 447, among other types of data. Data structure 440 also includes a number of data relationships 450 to 455. In the example shown, each data relationship 450 to 455 may be associated with a corresponding frequency 442. Each frequency 442 may be correlated to an SPS metric 445, each of which may be calculated by frequency calculator 416 based on data 443 and 444. Frequency optimizer 418 may be configured to analyze the data in data structure 440 to determine an SPS 456 having a greatest value relative to other values of SPS 445. As such, a frequency 442 associated with SPS 456 can be selected as default frequency 458. Any of data in data structure 440 may be optional and/or omitted, according to some examples.

Figure 5:
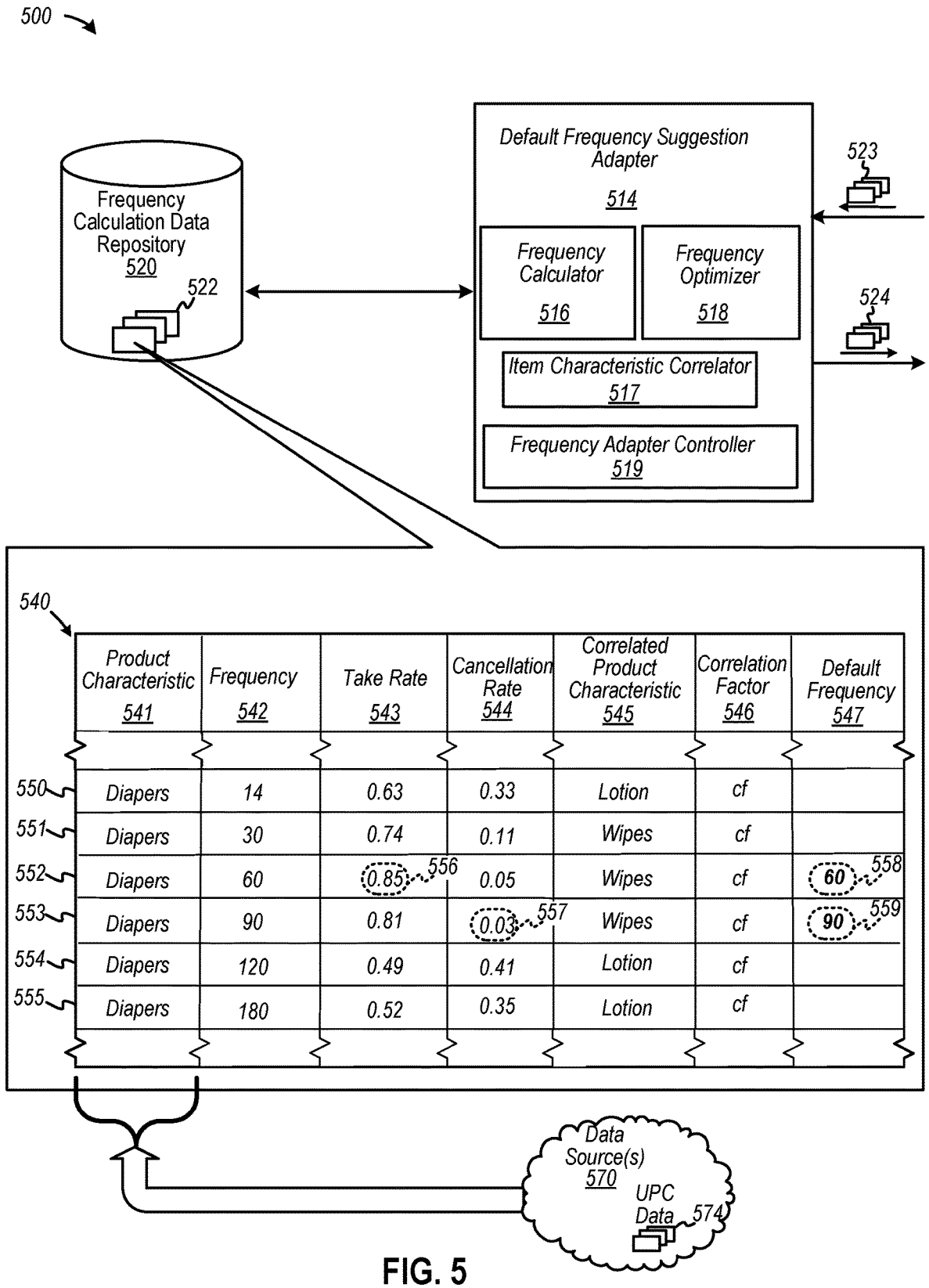
FIG. 5 is a diagram depicting a default frequency suggestion adapter configured to determine a default frequency based other metrics and/or item characteristics, according to some examples.

FIG. 5 is a diagram depicting a default frequency suggestion adapter configured to determine a default frequency based other metrics and/or item characteristics, according to some examples. Diagram 500 includes a frequency calculation data repository 520 and a default frequency suggestion adapter 514, which is shown to include a frequency calculator 516, a frequency optimizer 518, an item characteristic correlator 517, and a frequency adapter controller 519. Item characteristic correlator 517 may be configured to correlate one or more item characteristics of a particular item or other items (e.g., complementary items) to one or more frequencies from which a default frequency may be identified. Examples of item characteristics that may correlate to a frequency include take rate data 543, cancellation rate data 544, etc., whereby item characteristic correlator 517 may be configured to correlate data 543 or data 544 to a frequency 542 for determining a default frequency 547. According to some examples, elements depicted in diagram 500 of FIG. 5 may include structures and/or functions as similarly-named or similarly-numbered elements depicted in other drawings.

Diagram 500 also depicts an arrangement of the data 540 as a data structure to maintain data for default frequency generation. Data 540 may include, for example, data 541 representing one or more product characteristics, data 543 representing a number of take rates for frequencies 542, data 544 representing a number of cancellation rates for frequencies 542, a subset of one or more similar correlated product characteristic 545 (e.g., characteristics of complementary items, such as baby lotion and wipes), data representing a correlation factor 546 indicating a degree of correlation (with which to use a particular correlated data set), and data representing a default frequency 547. Data 543 and 544, among others, may be received into default frequency suggestion adapter 514 as data 523. According to some examples, item characteristic correlator 517 may correlate other product characteristics of other products (e.g., similar product sold by another merchant) using, for example, UPC data 574 from other data sources 570 (e.g., other merchant-related data).

Data structure 540 also includes a number of data relationships 550 to 555. In the example shown, each data relationship 550 to 555 may be associated with a corresponding frequency 542. Each frequency 542 may be correlated to a take rate metric 543, each of which may be determined by default frequency suggestion adapter 414. A frequency 542 also may be correlated to a cancellation rate metric 544, each of which may be determined by default frequency suggestion adapter 414. Frequency optimizer 518 may be configured to analyze the data in data structure 540 to determine a take rate 556 having a value with which to correlate to frequency ("60") 542, which may be selected as a default frequency 558. Similarly, frequency optimizer 518 may be configured to analyze the data in data structure 540 to determine a cancellation rate 557 having a value with which to correlate to frequency ("90") 542, which may be selected as a default frequency 559. Any of data in data structure 540 may be optional and/or omitted, according to some examples.

Figure 6:
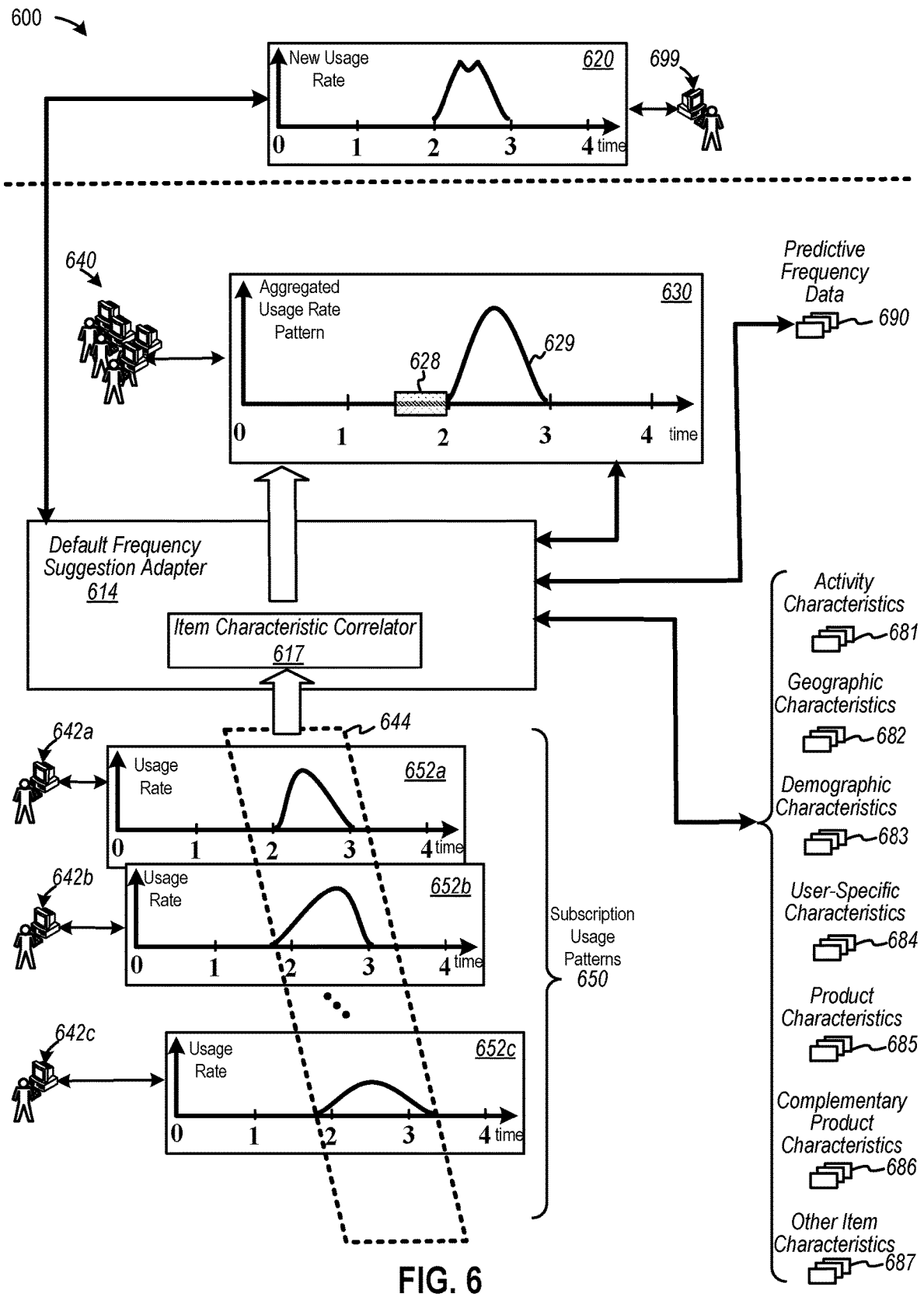
FIG. 6 is a diagram depicting an example of operation for a default frequency suggestion adapter to generate predictive frequency data, according to some embodiments.

FIG. 6 is a diagram depicting an example of operation for a default frequency suggestion adapter to generate predictive frequency data, according to some embodiments. Diagram 600 depicts a default frequency suggestion adapter 614 including an item characteristic correlator 617, which may be configured to identify one or more item characteristics 644 with which to correlate to determine or derive data that may be further used to derive or predict a default frequency as predictive frequency data 690. In some examples, item characteristic correlator 617 may be configured to generate (or characterize) an aggregated item characteristic 629 that may specify attributes of a particular aggregated item characteristic aggregated for a number of subscribers 640 (over subscribers 642a, 642b, and 642c).

To illustrate, consider that item characteristic correlator 617 is configured to identify usage rates 652a to 652c (e.g., a rate at which a product or service is subscribed, or consumed or depleted) for corresponding subscriber accounts 642a to 642c. In this example, consider that subscriber 642a to 642c purchase a "laundry detergent" having usage rates 652a to 652b. Usage rates between "0" and "1" (e.g., usage amounts during a spring season), usage rates between "1" and "2" (e.g., usage amounts during a summer season), and usage rates between "2" and "3" (e.g., usage amounts during a fall season). It may be that subscribers 642a to 642c play football during the fall, and consequently uses more laundry detergent due to football practices and games in inclement weather (e.g., due to muddy fields, etc.) Thus, default frequency suggestion adapter 614 may be able to discern patterns 650 of usage. Further, default frequency suggestion adapter 614 may aggregate the usage rates to form an aggregated usage rate pattern 630 for a group of subscribers 640. Based on aggregated usage rate pattern 630, default frequency suggestion adapter 614 may be able to generate or predict a default frequency 690.

Default frequency suggestion adapter 614 may also use other types of data with which to evaluate when calculating a default frequency. Examples of such data are shown in diagram 600 and may include activity characteristics data 681 (e.g., characteristics indicative of participation in a sport or task), geographic characteristic data 682, demographic characteristic data 683 (e.g., aggregated subscriber data), user-specific characteristic data 684 (e.g., history of purchases by a user, etc.), product characteristics data 685, complementary product characteristics data 686, and other item characteristics data 687.

Based on the above, default frequency suggestion adapter 614 may be configured to identify a usage rate 620 of a new subscriber 699, and further configured to match the new usage rate 620 against aggregated usage rate 629 of aggregated usage rate pattern 630 to predict, for example, that subscriber 699 "plays football," as well as other characteristics of the subscriber with which to derive a refined default frequency. According to some examples, default frequency suggestion adapter 614 may predict future participation in an activity or an increase in usage rate during interval 628. Thus, default frequency suggestion adapter 614 may adapt default frequency so as to prepare a subscriber for increased usage rates by adjusting the default frequency to reflect an increased laundry detergent amount or a decreased amount of time between shipments. Note that the example described in diagram 600 is not intended to be limiting to laundry detergent, but may be applicable to any characteristic of an item or other items.

Figure 7:
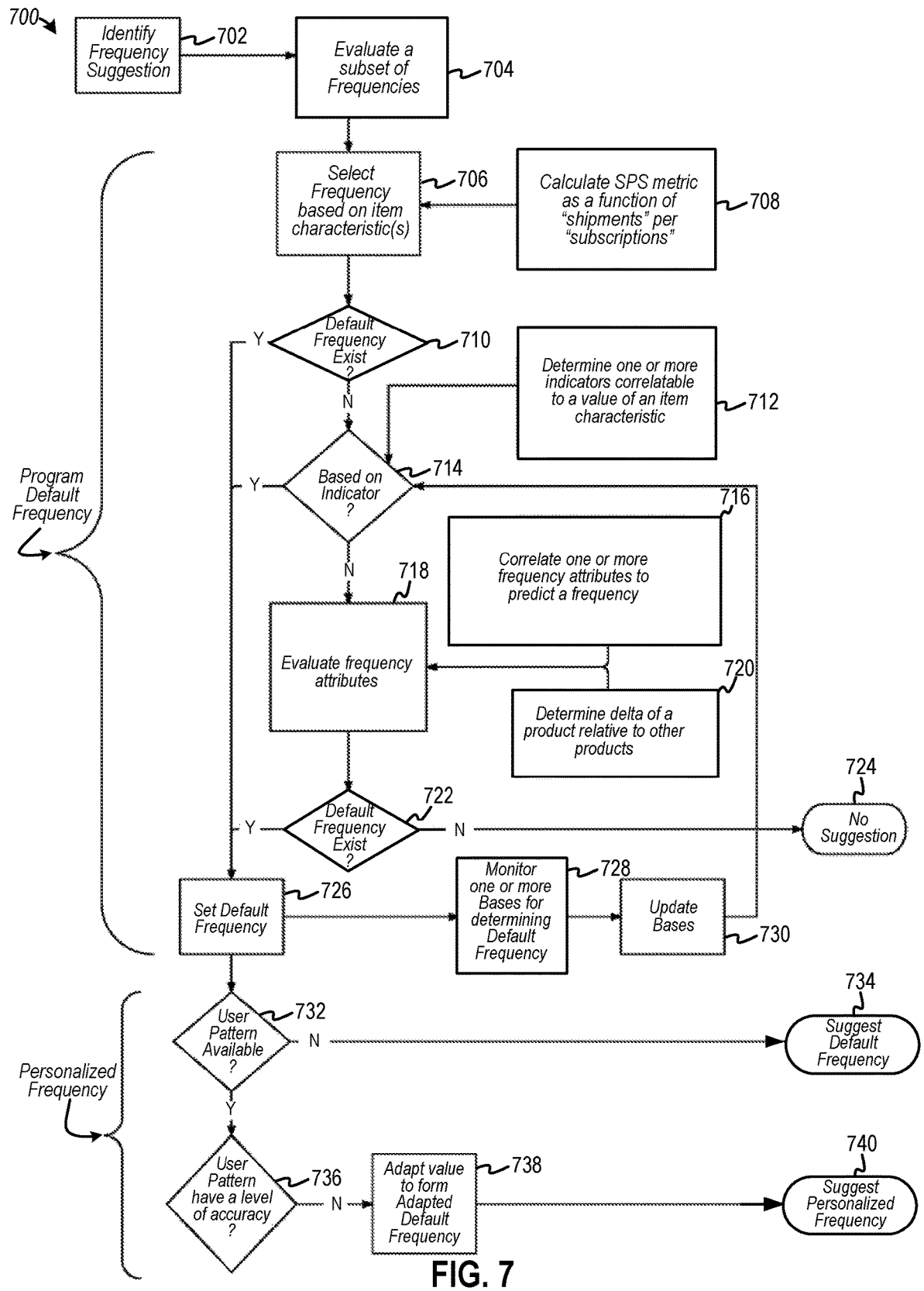
FIG. 7 depicts an example of a flow, according to some embodiments.

FIG. 7 depicts an example of a flow, according to some embodiments. At 702, a suggested default frequency for a product may be identified by, for example, being requested for a particular product or service. At 704, a subset of frequencies to be used as a default frequency may be evaluated to determine a default frequency based on criteria. For example, a suggested frequency may be retrieved based on a subset of frequencies each having an optimal metric value of, for example, an item characteristic, such as an optimal SPS (or any other metric or derived metric based on one or more item characteristics). At 706, a default frequency may be selected based on a highest valued SPS, which optionally may or may not be associated with a high level or degree of confidence. As shown, one example of an SPS metric, as determined at 708, may be a ratio of a quantity of shipments relative to a quantity of subscriptions. In some examples, a SPS metric may be calculated as a function of "shipments" per "subscriptions" and based, optionally, on an age of subscription. A determination is made at 710 whether a default frequency exists, for example, based on an optimal SPS. If so, flow continues to set the frequency as a default frequency at 726. If not, flow 700 continues to 714, at which frequency indicators are analyzed to determine whether such indicators can be correlated to a default frequency. In at least one example, an indicator may be determined based on one or more item characteristics, whereby the value of the indicator may be correlatable to a default frequency. Examples of frequency indicators that can be determined at 712 include, for example, a "cancellation rate," a "take rate," etc., or any other metric or derived values. As such, a value representing a cancellation rate may be correlatable to a default frequency.

Flow 700 may pass to 718 at which frequency attributes may be evaluated to determine a default frequency. At 716, frequency attributes, such as UPC data, may be analyzed to determine similarities that may be useful to determine a default frequency, based on statistically correlated items as determined by methods performed at 720. At 720, a delta or degree of similarity of an item to other items may be determined through one or more statistical methods to identify relatively small differences in attribute values to maximize a probability that a default frequency may be correlated to another item. In some examples, one or more frequency attributes may be correlated at 716 to predict a frequency. Frequency attributes may be used to correlate a product or item to other products or items (e.g., complementary products) on similarities that may lead to expected frequency alignment (e.g., mustard may provide an expected reordering frequency alignment with ketchup). Further, frequency attributes may include UPC data, product categories (e.g., "diapers," "nail polish," "shampoo," "laundry detergent," etc.). According to some examples, a combination two or more frequency attributes with which to determine a default frequency may be prioritized based on, for example, testing, curation, etc.

If a default frequency is not available at 722, flow 700 may generate a notification that there is no suggested default frequency at 724. If so, flow 700 may flow to 726 at which a default frequency may be set for use. Flow 700 may continue to 728 at which one or more bases for determining a default frequency (e.g., indicators) may be monitored to determine whether a subscription is being serviced suboptimally. That is, whether indicators or another basis for determining a default frequency is sufficient to predict accurately a time at which a product may be reordered (i.e., based on depletion or replenishment). At 730, indicators, frequency attribute, or item characteristics or any other basis for enhancing implementation a default frequency may be updated.

At 732, a determination is made whether data representing a pattern of user behavior is available, such as a pattern of purchasing an item or product (e.g., whether a subscriber's purchase history is available). If not, flow 700 moves to 734, whereby a default frequency may be implemented. Otherwise, flow 700 moves to 736 at which a determination may be made to determine an accuracy of data is predictive (e.g., a relatively high confidence level that a purchase pattern may identify an adapted, modified, or updated default frequency). At 738, purchase pattern data may be used to adjust the default frequency (e.g., by modifying an SPS value) at 738, after which flow 700 provides an adapted default frequency at 740, whereby the adapted default frequency may be customized, or "personalized," to adapt to a particular user. Note that the flow 700 is not intended to be limiting and is merely an example of any number of ways of performing frequency adaption to generate or identify a default frequency according to various examples. For example, flow 700 need not be limited to implementations including subscriptions. Hence, flow 700 may be implemented independent of a subscription integration platform and/or may be adapted to convey offers via any communication medium, whether electronic (e.g., web pages, emails, text messages, etc.) or non-electronic.

Figure 8:
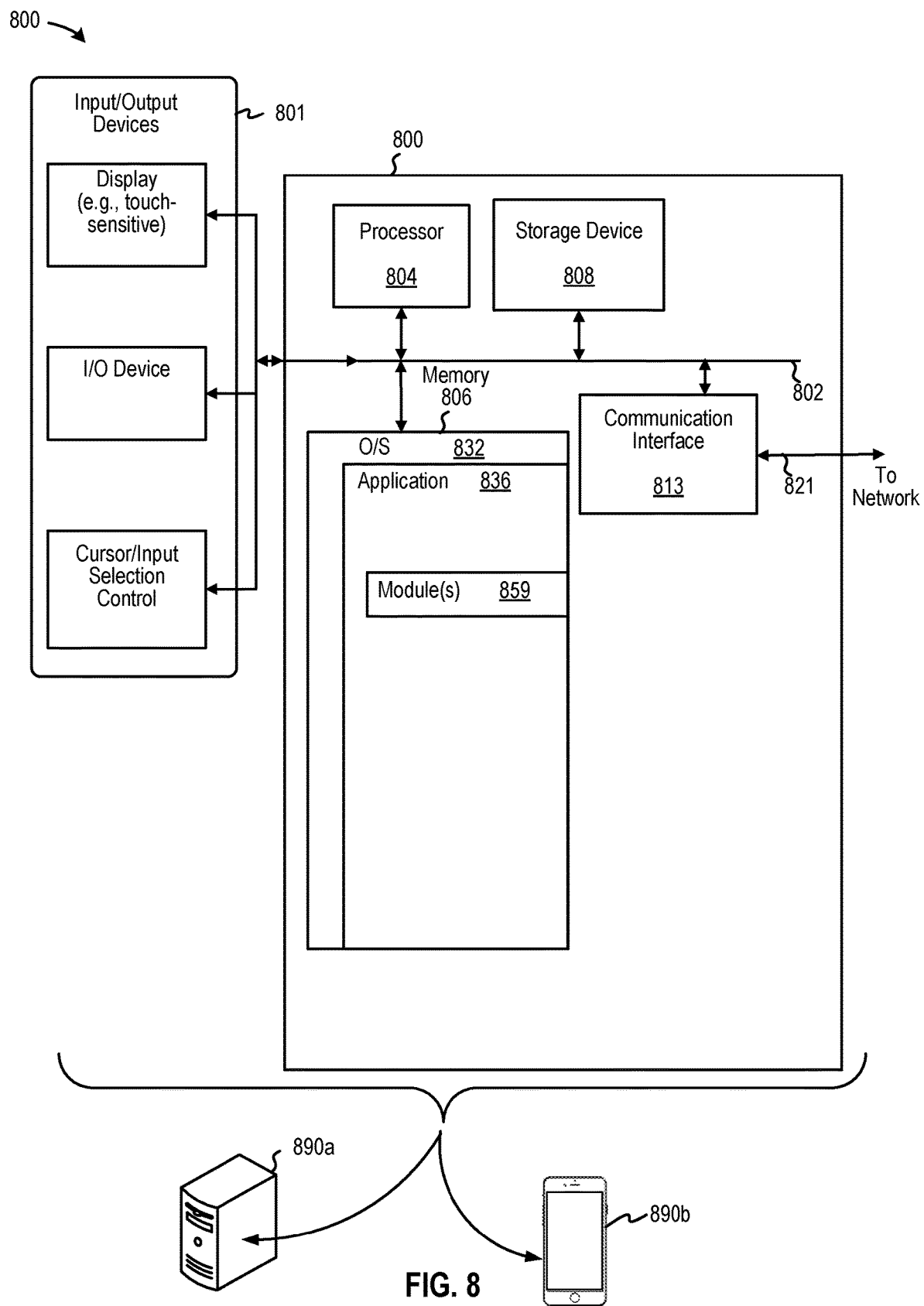
FIG. 8 illustrates examples of various computing platforms configured to provide various functionalities to adapt a frequency to form a default frequency, according to various embodiments.

FIG. 8 illustrates examples of various computing platforms configured to provide various functionalities to adapt a frequency to form a default frequency, according to various embodiments. In some examples, computing platform 800 may be used to implement computer programs, applications, methods, processes, algorithms, or other software, as well as any hardware implementation thereof, to perform the above-described techniques.

In some cases, computing platform 800 or any portion (e.g., any structural or functional portion) can be disposed in any device, such as a computing device 890a, mobile computing device 890b, and/or a processing circuit in association with forming a default frequency according to various examples described herein.

Computing platform 800 includes a bus 802 or other communication mechanism for communicating information, which interconnects subsystems and devices, such as processor 804, system memory 806 (e.g., RAM, etc.), storage device 808 (e.g., ROM, etc.), an in-memory cache (which may be implemented in RAM 806 or other portions of computing platform 800), a communication interface 813 (e.g., an Ethernet or wireless controller, a Bluetooth controller, NFC logic, etc.) to facilitate communications via a port on communication link 821 to communicate, for example, with a computing device, including mobile computing and/or communication devices with processors, including database devices (e.g., storage devices configured to store any types of data, etc.). Processor 804 can be implemented as one or more graphics processing units ("GPUs"), as one or more central processing units ("CPUs"), such as those manufactured by Intel® Corporation, or as one or more virtual processors, as well as any combination of CPUs and virtual processors. Computing platform 800 exchanges data representing inputs and outputs via input-and-output devices 801, including, but not limited to, keyboards, mice, audio inputs (e.g., speech-to-text driven devices), user interfaces, displays, monitors, cursors, touch-sensitive displays, LCD or LED displays, and other I/O-related devices.

Note that in some examples, input-and-output devices 801 may be implemented as, or otherwise substituted with, a user interface in a computing device associated with a subscriber or user account identifier in accordance with the various examples described herein.

According to some examples, computing platform 800 performs specific operations by processor 804 executing one or more sequences of one or more instructions stored in system memory 806, and computing platform 800 can be implemented in a client-server arrangement, peer-to-peer arrangement, or as any mobile computing device, including smart phones and the like. Such instructions or data may be read into system memory 806 from another computer readable medium, such as storage device 808. In some examples, hard-wired circuitry may be used in place of or in combination with software instructions for implementation. Instructions may be embedded in software or firmware. The term "computer readable medium" refers to any tangible medium that participates in providing instructions to processor 804 for execution. Such a medium may take many forms, including but not limited to, non-volatile media and volatile media. Non-volatile media includes, for example, optical or magnetic disks and the like. Volatile media includes dynamic memory, such as system memory 806.

Known forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can access data. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 802 for transmitting a computer data signal.

In some examples, execution of the sequences of instructions may be performed by computing platform 800. According to some examples, computing platform 800 can be coupled by communication link 821 (e.g., a wired network, such as LAN, PSTN, or any wireless network, including WiFi of various standards and protocols, Bluetooth®, NFC, Zig-Bee, etc.) to any other processor to perform the sequence of instructions in coordination with (or asynchronous to) one another. Computing platform 800 may transmit and receive messages, data, and instructions, including program code (e.g., application code) through communication link 821 and communication interface 813. Received program code may be executed by processor 804 as it is received, and/or stored in memory 806 or other non-volatile storage for later execution.

In the example shown, system memory 806 can include various modules that include executable instructions to implement functionalities described herein. System memory 806 may include an operating system ("O/S") 832, as well as an application 836 and/or logic module(s) 859.

The structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. According to some embodiments, the term "module" can refer, for example, to an algorithm or a portion thereof, and/or logic implemented in either hardware circuitry or software, or a combination thereof. These can be varied and are not limited to the examples or descriptions provided.

In some embodiments, modules 859 of FIG. 8, or one or more of their components, or any process or device described herein, can be in communication (e.g., wired or wirelessly) with a mobile device, such as a mobile phone or computing device, or can be disposed therein.

In some cases, a mobile device, or any networked computing device (not shown) in communication with one or more modules 859 or one or more of its/their components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figures can represent one or more algorithms. Or, at least one of the elements can represent a portion of logic including a portion of hardware configured to provide constituent structures and/or functionalities.

For example, modules 859 of FIG. 8 or one or more of its/their components, or any process or device described herein, can be implemented in one or more computing devices (i.e., any mobile computing device, such as a wearable device, such as a hat or headband, or mobile phone, whether worn or carried) that include one or more processors configured to execute one or more algorithms in memory. Thus, at least some of the elements in the above-described figures can represent one or more algorithms. Or, at least one of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit.

For example, modules 859 of FIG. 8, or one or more of its/their components, or any process or device described herein, can be implemented in one or more computing devices that include one or more circuits. Thus, at least one of the elements in the above-described figures can represent one or more components of hardware. Or, at least one of the elements can represent a portion of logic including a portion of a circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

According to some examples, a method may include identifying item characteristics associated with an item, determining a frequency based on at least an item characteristic at which the item is scheduled for distribution, for example, to one or more geographic locations corresponding to a subset of subscriber accounts. In some examples, an item characteristic may specify a metric. The method may also include formatting data representing the frequency and a subset of the item characteristics to form formatted data to integrate with a web page generated for a merchant computing system, and transmitting the formatted data to a user interface to display a display portion based on the formatted data as an integrated portion of an integrated web page including the web page.

According to some examples, the method can include injecting a display portion to represent a subscription offer. Also, the method may include monitoring one or more item characteristics, updating one or more values for the one or more item characteristics to form updated values, adapting the frequency to form an adapted frequency based the updated values, and formatting data (e.g., formatting for presentation on a user interface) representing the adapted frequency for injection in the display portion. Further, the method may include calculating modification of delivery characteristics based on the adapted frequency. Note that determining the frequency based on the item characteristic may include determining a first item characteristic including determining an item usage rate. Determining the item usage rate may include determining a depletion rate of the first item. Determining the first item characteristic may include identifying a number of subscriptions for the item for each of a subset of frequencies, determining a number of shipments for the item for each of the subset of frequencies, generating a value of the first item characteristic for each of the subset of frequencies, and selecting the frequency as a default frequency from the subset of frequencies associated with the with which to ship the item. Selecting the frequency may include determining a greatest value for the first item characteristic. Determining the first item characteristic may include calculating values for shipments per subscriptions ("SPS") as a first metric. Note that the first item characteristic need not be limited to an SPS metric and may be any value representing any characteristic of an item.

Further to the method, determining the frequency based on the item characteristic may include determining a second item characteristic including identifying a second item characteristic, and analyzing the second item characteristic to determine an adaption factor. The adaption factor may be configured to adjust the frequency as a function of the second item characteristic. Examples of a second item characteristic can be used as a substitute for SPS or an enhancement of the SPS. Further, the method may include presenting data that represents the adapted frequency as the frequency to the display portion. The method may include calculating the second item characteristic based on one or more of a frequency indicator (e.g., based on a take rate, cancellation rate, etc.), a frequency attribute ((e.g., product attribute, such as UPC), and a usage characteristic (e.g., user-specific attributes, etc.).

Figure 9:
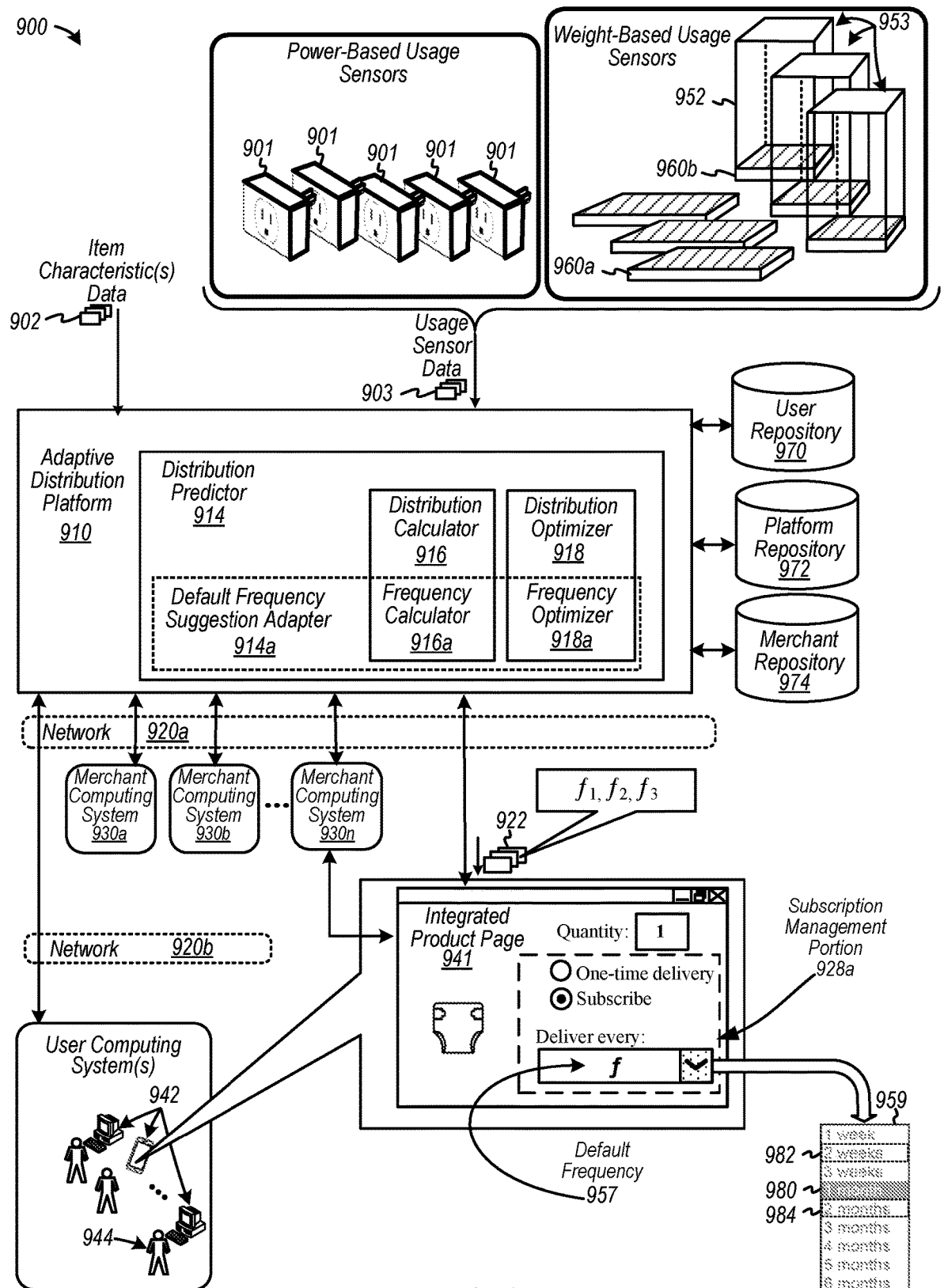
FIG. 9 is a diagram depicting another example of a default frequency suggestion adapter, according to some embodiments.

FIG. 9 is a diagram depicting another example of a default frequency suggestion adapter, according to some embodiments. In this example, a default frequency suggestion adapter 914a may be implemented as subsidiary logic or interchangeable logic having similar or equivalent functionalities and/or structures as a distribution predictor 914 of an adaptive distribution platform 910. Diagram 900 depicts adaptive distribution platform 910 being configured to facilitate automatic determination of a timing of distribution of items in accordance with an adaptive schedule, which may be defined by a default frequency ("$f_{default}$"). For example, adaptive distribution platform 910 may be configured to initiate generation of data representing a default frequency adapted to replenish an item, which may be any good or service. The timing of distribution (e.g., shipment) may be adapted to a specific user 944 (or group of users 944). In the example shown, adaptive distribution platform 910 may include a distribution predictor 914 as well as other elements (not shown), any of which may include logic, whether implemented in hardware or software, or a combination thereof. Distribution predictor 914 is shown to include at least a distribution calculator 916 and a distribution optimizer 918.

Further, adaptive distribution platform 910 may also be configured to access one or more of a user repository 970 configured to store at least data describing user characteristics, a platform repository 972 configured to store platform-related characteristics in data, including item characteristic data 902, and a merchant repository 974 configured to store user-identification data as well as merchant-related information (e.g., production information, inventory information, etc.). User-identification data may be based on, for example, a unique identifier including on one or more of a location (e.g., a consumer's shipping address), a payment instrument identifier (e.g., a credit card number, etc.) and an electronic account identifier (e.g., identified by a mobile phone number or the like), according to some embodiments. Adaptive distribution platform 910, as described herein, may be configured to facilitate "adaptive" scheduling services to deliver or ship a product based on calculated default frequency, as described herein, via a computing system platform for multiple online or Internet-based retailers and service providers, both of which may be referred to as merchants. In this example, a merchant may be associated with a corresponding one of merchant computing systems 930a, 930b, or 930n that includes one or more computing devices (e.g., processors, servers, etc.), one or more memory storage devices (e.g., databases, data stores, etc.), and one or more applications (e.g., executable instructions for performing adaptive subscription services, etc.) communicatively networked, for example, via networks 920a and 920b. Examples of merchant computing systems 930a, 930b, or 930n may be implemented by any other online merchant. An example of one or more structures and/or functionalities to implement adaptive distribution platform 910 is set forth in U.S. patent application Ser. No. 15/716,486, filed on Sep. 26, 2017, which is herein incorporated by reference. According to some examples, elements depicted in diagram 900 of FIG. 9 may include structures and/or functions as similarly-named or similarly-numbered elements depicted in other drawings, such as FIGS. 1A to 2, among others.

Distribution predictor 914 may be configured to predict a point in time (or a range of time) at which an item may be exhausted, and based on the prediction, adaptive distribution platform 910 may be further configured to determine a zone of time (not shown) in which depletion and near exhaustion of an item is predicted. Distribution predictor 914 may include a distribution calculator 916 and a distribution optimizer 918. Distribution calculator 916 may be configured to calculate one or more predicted distribution events or replenishment-related data to form an adaptive schedule (e.g., an adaptive shipping schedule). Similar or equivalent logic in distribution calculator 916 may be configured to implement a frequency calculator 916a, which is configured to calculate one or more frequencies, one of which may be implemented as a default frequency. In some examples, determining a default frequency with which products may be reordered, as determined by frequency calculator 916a, may be correlatable or associated with calculating a predicted event, as formed by distribution calculator 916. In particular, a default frequency value may correlate to a rate of time at which an item is predicted to become depleted or exhausted.

Distribution calculator 916 may be configured to receive data representing item characteristics data 902, according to some embodiments, and may be configured further to determine (e.g., identify, calculate, derive, etc.) one or more distribution events based on one or more item characteristics 902, or combinations thereof (e.g., based on derived item characteristics). For example, distribution calculator 916 may compute a projected date of depletion for a particular product, such as a vitamin product, based on usage patterns and/or ordering patterns of a specific user 944. Note, however, a projected date of depletion may also be based on usage patterns and/or ordering patterns of other users 944 over any number of merchant computing systems 930a, 930b, and 930n. In some examples, a "default frequency" may be correlated to, or used interchangeably with, the terms a "projected date of depletion," a "predicted distribution event," a "predicted shipment date," a "predicted time of distribution," or the like.

One or more item characteristics 902 that may include, but are not limited to, data representing one or more characteristics of an item, shipment rate-related data, indicator-related data, frequency attribute-related data, and usage-related data, and the like. An item characteristic 902 may be derived or calculated based on one or more other item characteristics 902. Examples of item characteristics data 902 may include, but are not limited to, data representing one or more characteristics describing a product, such as a product classification (e.g., generic product name, such as paper towels), a product type (e.g., a brand name, whether derived from text or a code, such as a SKU, UPC, etc.), a product cost per unit, item data representing a Universal Product Code ("UPC"), item data representing a stock keeping unit ("SKU"), etc., for the same or similar items, or complementary and different items. Item characteristics 902 may also include product descriptions associated with either a SKU or UPC. Based on a UPC for paper towels, for example, item characteristics 902 may include a UPC code number, a manufacture name, a product super-category (e.g., paper towels listed under super-category "Home & Outdoor"), product description (e.g., "paper towels," "two-ply," "large size," etc.), a unit amount (e.g., 12 rolls), etc. Item characteristics 902 also may include any other product characteristic, and may also apply to a service, as well as a service type or any other service characteristic. In some examples, data representing item characteristics 902 may be accessed from and/or stored in any of repositories 970, 972, and 974.

Distribution optimizer 918 may be configured to optimize values of predicted distribution events to, for example, adapt scheduling of distributed items (i.e., product shipments) to conform (or substantially conform) to delivery or usage preferences of user 944 or a group of users 944. For example, distribution optimizer 918 may be configured to analyze data representing purchasing patterns related to a particular item ordered by a computing device 942 associated with a specific user 944. Based on the results of such an analysis, distribution optimizer 918 may be configured to emphasize certain item characteristics (or values thereof) that may align more closely to a user's ordering or reordering patterns. For example, replenishment of an exact brand name at a later date may be preferred by user 944 over substitution of a comparable other brand of the same product type at an earlier date. Similar or equivalent logic in distribution optimizer 918 may be configured to implement a frequency optimizer 918a, which may be configured to adapt a frequency to form default frequency 957 in a subscription management portion 928a integrated into an integrated product page 941, which may be generated by a merchant computing system (e.g., merchant computing system 930n). In some examples, determining a default frequency with which products may be reordered, as determined by frequency optimizer 918a, may be correlatable or associated with optimizing values of predicted distribution events, as determined by distribution optimizer 918.

In various examples, frequency optimizer 918a may be configured to adapt or otherwise optimize a frequency or a default frequency, as described herein, by implementing a SPS metric to select and generate a default frequency 922. In at least some examples, frequency optimizer 918a may determine, derive or calculate an "item usage rate," which may refer to rate at which an item is depleted or consumed to exhaustion (or an amount near exhaustion). A predicted distribution event for an item may be based on a usage rate of the item (e.g., a calculated usage rate), whereby a usage rate may be a rate at which a product or service is distributed or shipped (e.g., ordered or reordered), consumed, or depleted.

In one example, frequency optimizer 918a (and/or default frequency suggestion adapter 914a) may be configured to determine a usage rate of an item for a user 944 based on a predicted time of exhaustion, such as exemplified in an example in which a distribution event for a bottle of 30 vitamin tablets is predicted to occur at the 30th day (e.g., relative to a previous delivery). In another example, a usage rate of an item for user 944 may be based on the user's pattern of purchasing, using, ordering, or reordering the item (or generically similar or complementary items). For example, a usage rate may be predicted based on replenishment of an item, such as a bottle of ketchup, and on a user's past rates of replenishment (e.g., shipment rates). The usage rate may be expressed in terms of a median or average time between successive requests to reorder an item. Also, a usage rate may be predicted or supplemented by predicting a time that ketchup is consumed or exhausted based on rates of past replenishment of mustard, which is a complementary product having a usage rates that may correlate to that of ketchup as both items may be used together (and thus consumed at similar depletion rates). Other users' patterns of purchasing, using, ordering, or reordering of the same item (e.g., same brand of vitamin A at the same merchant) or equivalent item (e.g., different brands of vitamin A at the same or different merchants) may also be used to predict a usage rate. To illustrate, consider that user 944 is replenishing an item, such a vitamin A tablets, at a merchant X. However, there may be negligible information to predict a usage rate (or a time of distribution) for that item at merchant X. Therefore, other users' patterns of reordering vitamin A at another merchant, merchant Y, may be used to form a predicted time of distribution for use in purchasing vitamin A tablets at merchant X.

In some examples, a usage rate to determine a predicted time of distribution may be based on identifying distribution rates of an item relative to one or more other accounts associated with one or more other users or other user computing systems to form an aggregate usage rate. An aggregated usage rate for an item may express, for example, a nominal usage rate that may be used (at least initially) to ascertain predicted time of reorder with a relatively high degree of confidence. Thus, the aggregated usage rate may be used to generate a predicted time of distribution. According to one implementation, usage rates associated with other users may originate from item characteristic data accessed from one or more merchant computing systems 930a, 930b, and 930n. The usage rates received from merchants may be to determine a predicted time of distribution for an item. As an example, usage rates may be derived by analyzing shipment rates of an item to identify time periods between deliveries (i.e., time intervals between order and reorder) relative to one or more merchant computing systems 930a, 930b, and 930n. Thereafter, a usage rate may be used to determine a default frequency.

According to various embodiments, accuracy of a usage rate may be enhanced based on sensor data (from one or more sensors 901 and 960) that may correlate to usage of a consumable item. To illustrate, consider that diagram 900 depicts a number of sensors 901 and 960 associated with a user account associated and user computing system 942. Sensors 901 and 960 are configured to generate one or more usage rates for a variety of consumables—in situ—at a geographic location, such as a residence or building. In accordance with various embodiments, any number of products that may be ordered online, for example, may be associated with a user account associated with user computing system 942.

Sensors 901 may be configured to determine an amount of power consumed via device or appliance that may be correlated to an amount of a consumable that is consumed during operation of a device. In some examples, sensor 901 may be coupled to a power outlet and to an appliance or electrical machine to detect an amount of power consumed by the appliance for determining an amount of a product (e.g., ground coffee) consumed, which, in turn, assists in determining a remaining inventory of coffee. Other sensors 901 may be used to correlate power consumption of other electrical devices to other consumable products. Sensors 960 may detect a characteristic of a consumable, such as a weight of the consumable, to determine or enhance a usage rate of consumable. As shown, a weight monitoring sensor 960n may be integrated with a container 952 to form an inventoriable container 953, which, for example, may be configured to determine a weight of its contents, and thus, an amount of coffee or any other solid or liquid consumable. In some implementations, weight monitoring sensor 960a may be implement without container 952 for use, for example, in a refrigerator to monitor a consumption rate of milk by monitoring a weight of a container of milk.

An example of a state of an inventory monitored by sensors 901 and 960 may include a value representing a weight of a consumable at a point in time. As shown, raw data in usage sensor data 903, such as raw sensor data, may be transmitted to adaptive distribution platform 910 to determine a state of inventory of an item. The raw data, at least in some examples, may include raw sensor data, such as one or more values representing electrical energy used per unit time, such as in units of watts or kilowatts ("kWs"). Adaptive distribution platform 910 may also receive updated data as part of usage sensor data 903 that describes a state or change of unit of consumption or a weight, among other things. Thus, the updated data may include data representing a weight of a consumable, which adaptive distribution platform 910 may monitor to determine whether to replenish the inventory at a location associated with user 944. Otherwise, adaptive distribution platform 910 may receive reorder data as part of usage sensor data 903 to invoke replenishment of an item, such as a bag of coffee beans. Examples of sensors 901 and 960, as well as structures and/or functionalities thereof, in operation with an adaptive distribution platform are described in U.S. Nonprovisional patent application Ser. No. 15/801,002, filed on Nov. 1, 2017 and titled "Consumable Usage Sensors and Applications to Facilitate Automated Replenishment of Consumables Via an Adaptive Distribution Platform,", which is herein incorporated by reference.

According to some examples, usage rates based on power-based usage sensors and weight-based usage sensors may be implemented to formulate a default frequency 922, which may be adapted to a group of users 944 or customized or personalized to a particular user 944. As shown, default frequency 957 relate to a frequency 980 (e.g., ship every 1 month interval) may dynamically change to any of frequencies 959, such as frequency 982 (e.g., ship every 2 week interval) or frequency 984 (e.g., ship every 2 month interval).

In view of the foregoing, the structures and/or functionalities depicted in FIG. 9 may illustrate an example of a computer programmable platform configured to calculate a default frequency to facilitate selection of an optimal frequency with which to reorder an item to replenish an inventory thereby enhancing computer operations by reducing consumption of resources and time for both users and merchants, as well as associated computing systems. Thus, "friction" typically experienced in replenishment of products may be reduced or negated, at least in some cases. In some examples, adaptive distribution platform 910 may provide replenishment services for multiple entities (e.g., for multiple merchant computing systems 930), thereby reducing resources that otherwise may be needed to perform replenishment services individually at each merchant computing system 930a, 930b, and 930n.

In some examples, adaptive distribution platform 910 is configured to generate formatting data (e.g., XML, JSON, etc.) that may represent or include data representing a default frequency with which to integrate to form a hybrid webpage of a merchant computing system. Adaptive distribution platform 910 is configured to collaborate with, for example, a web server of a merchant computing system 930 to construct and serve to user 944 a new, hybrid web page that merges content associated generated by adaptive distribution platform 910 (e.g., as a third-party) to generate an integrated product page 941. Thus, subscription management portion 928a may be injected into page 914 (e.g., seamlessly) so that integrated product page 941 may be presented to a user 944, whereby the user need not discern subscription management portion 928a originates from other than merchant 930n. As such, platform 910 may be configured to generate hybrid web pages, such as integrated product page 941, whereby multiple entities may be configured to collaborate to facilitate optimal delivery of items among disparate entities from which at least a portion of a service is implemented.

According to some embodiments, adaptive distribution platform 910 is configured to determine usage rates by automatically performing in-situ inventory monitoring of consumables and automated replenishment and distribution of items (e.g., shipping an item) that are ordered or reordered in accordance with various implementations set forth herein or incorporated by reference. According to some embodiments, adaptive distribution platform 910 may be configured to facilitate online ordering and shipment of a product responsive to sensor data retrieved from sensors 901, 960, or any other sensor. Real-time (or near real-time) consumption amounts or rate may be determined for items being monitored by sensors 901, 960, and the like, thereby improving accuracy in determining shipment quantities and timing, among other things, according to various examples. Thus, consumption of resources and time for both users and merchant, as well as associated computing systems, may be further reduced with implementation of sensors 901 and 960 to perform in-situ inventory management, at least in some cases. In some examples, adaptive distribution platform 910 may provide replenishment services for multiple entities (e.g., for multiple merchant computing systems 930), thereby reducing resources that otherwise may be needed to perform replenishment services individually at each merchant computing system 930a, 930b, and 930n. In some cases, in-situ inventory monitoring may obviate a need to perform a step of monitoring that may otherwise encumber usage of a consumable.

In some examples, the various structures and/or functions described herein may facilitate in-situ inventory monitoring and/or automated replenishment of non-consumable items or services. In other examples, any item, material, resource, or product, finished or unfinished, could be replenished using the techniques described herein.

Figure 10:
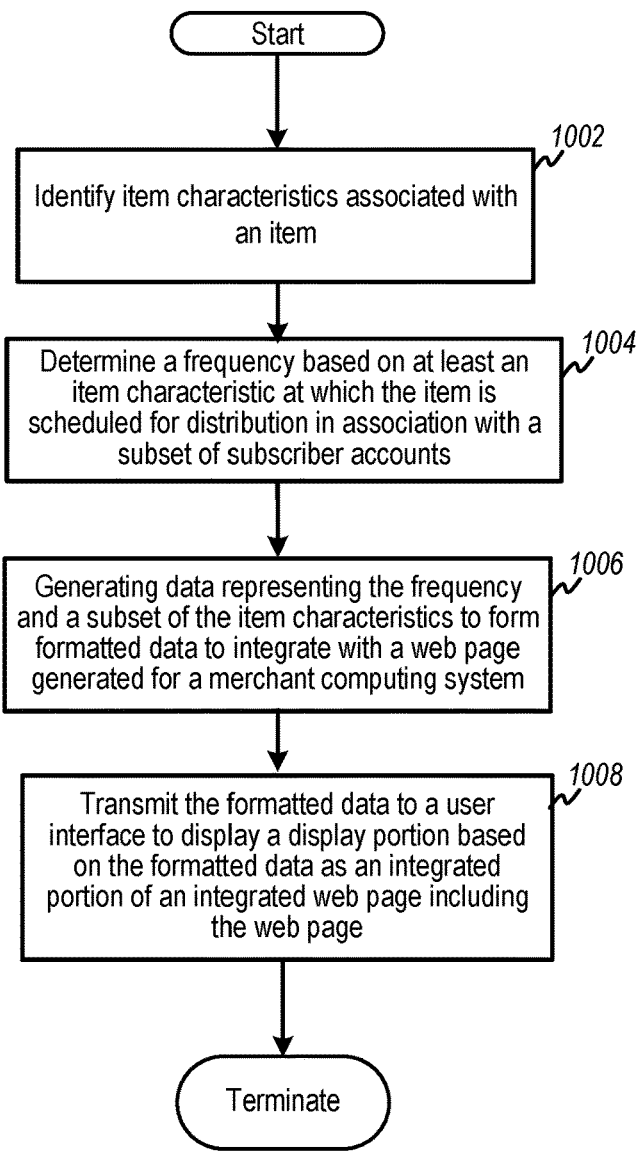
FIG. 10 is a diagram depicting an example of a flow, according to some embodiments.

FIG. 10 is a diagram depicting an example of a flow, according to some embodiments. At 1002 of flow 1000, data representing one or more item characteristics associated with an item may be identified. As described herein, an item characteristic that may include data representing one or more characteristics of an item, shipment rate-related data, indicator-related data (e.g., SPS metric data), frequency attribute-related data, and/or usage-related data. In some examples, usage-related data may also include power-based usage rate or a weight-based usage rate as provided by (or sensed by) corresponding sensors.

At 1004, a frequency based on at least an item characteristic may be determined. The item characteristic may be associated with an item that is scheduled for distribution (e.g., shipment) in association with a subset of subscriber accounts (e.g., for one or more subscribers). In one example, a frequency may be determined based on an item characteristic, which, in turn, may be derived from (or is associated with) an item usage rate, whereby the frequency may be set as a default frequency (e.g., a default ship rate). In some cases, an item usage rate may be determined by identifying a depletion rate of the item. A depletion rate may derived from a rate at which a user (or a subset of users) reorder an item, among other ways to determine an item usage rate (e.g., based on usage patterns and/or ordering patterns of other users over any number of merchant computing systems). For example, an item characteristic may be determined by identifying a number of subscriptions for the item for each of a subset of frequencies (e.g., for each of a subset of ship rates) and then determining a number of shipments for the item for each of the subset of frequencies. A value of the item characteristic can be generated for each of the subset of frequencies, whereby the value may represent a value for shipments per subscriptions ("SPS") as a metric. A default frequency may be selected from a subset of frequencies associated with which to ship the item based on, for example, a greatest value of the SPS metric. The greatest SPS value may correlate to an optimized default frequency, according to a least one instance. According to some examples, the item characteristic that may be used as an item usage rate may include usage data based on power consumption sensor, a weight-monitoring sensor, or any other sensor.

In some other examples, a frequency may be optimized to form an adapted frequency (e.g., as an adapted default frequency). One or more item characteristics may be monitored to determine whether a value of an item characteristic changes. Further, one or more values for the one or more item characteristics can be detected to identify updated values, which are based on a changed item characteristic value. A frequency may then be modified to form an adapted frequency based the updated values. For example, purchasing behaviors or patterns of a user or a group of users may change such that a default frequency may be adjusted. Updating or recalculating a default frequency dynamically adapts one or more frequencies to form a dynamically-generated default frequency that may be calculated adjust a default frequency to changing purchasing patterns of one or more consumers.

In yet some other examples, a default frequency may be determined, in whole or in part, based on another item characteristic. For example, a frequency may be determined based on an item characteristic or in combination (e.g., arithmetic or mathematical) with another item characteristic. In one example, a second item characteristic may be identified and analyzed to determine an adaption factor, whereby the adaption factor may be configured to adjust the frequency as a function of the second item characteristic. The second item characteristic can be used as a substitute for a SPS value as first characteristic, or may be used to enhance accuracy of a default frequency. In some cases, a second item characteristic may be calculated based on one or more of a frequency indicator (e.g., a "take rate"), a frequency attribute, and a usage characteristic. Usage characteristic examples include a power-based usage rate, a weight-based usage rate, and the like.

At 1006, data representing a frequency and a subset of the item characteristics may be generated to form formatted data to integrate with a web page generated for a merchant computing system. The frequency may be a default frequency, which may be adapted or optimized, and subset of the item characteristics may include a product identifier or a product type, a price, a quantity, a volume, an amount, and the like, as well as modifiable delivery characteristics, such as shipment dates (e.g., based on an adapted frequency). In some cases, a delivery characteristic may specify whether delivery is in accordance with a one-time order or a subscription. The data representing a frequency and a subset of the item characteristics may be formatted as data to be injected as the subscription management portion of a user interface into merchant-controlled web site. At 1008, formatted data may be transmitted to a user interface to display a display portion based on the formatted data as an integrated portion of an integrated web page including the web page. In some examples, a display portion configured to represent a subscription offer may be injected as the integrated portion to form an integrated webpage.

Figure 11:
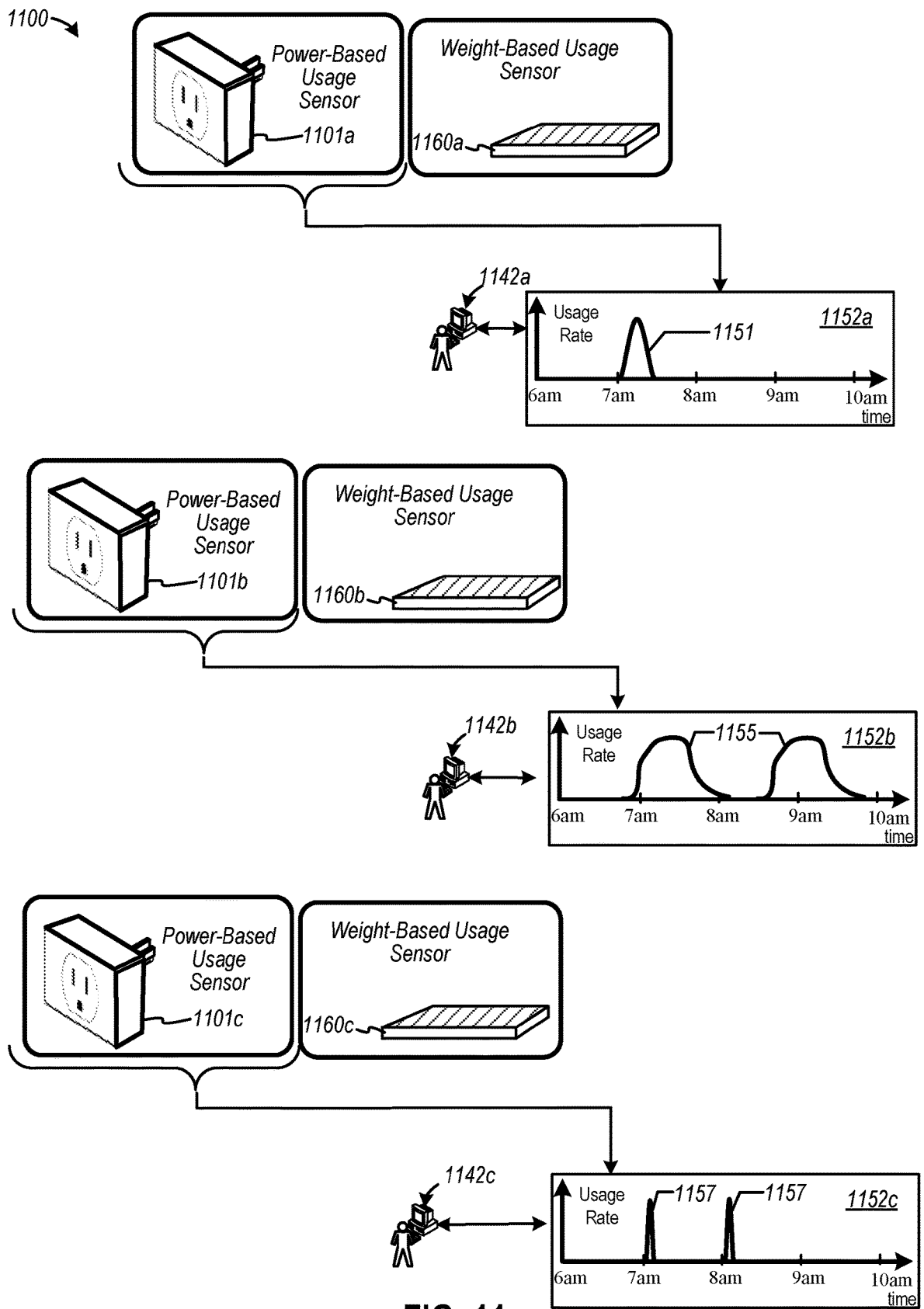
FIG. 11 is a diagram depicting determinations of usage rates to generate default frequencies, according to some examples.

FIG. 11 is a diagram depicting determinations of usage rates to generate default frequencies, according to some examples. Diagram 1100 depicts power-based usage sensors 1101a, 1101b, and 1101c implemented to determine usage rates 1152a, 1152b, and 1152c, respectively, for users and user computing devices 1142a, 1142b, and 1142c. Power-based usage sensors 1101a, 1101b, and 1101c are configured to detect power consumption, for example, by a coffee-making machine (e.g., coffee pot or espresso machine). Usage rate 1152a may be shown to include a power consumption curve 1151, which may be, at least in this example, indicative of a power consumed by making 10 cups of coffee between 6 am to 10 am. If no other coffee is produced or consumed that day, then characteristics of power consumption curve 1151 can be used to identify an amount of coffee (e.g., 10 tablespoons) consumed in one day to produce 10 cups of coffee. An inventory of coffee then can be reduced by 10 tablespoons and inventory monitoring continues until a point at which inventory ought to be replenished. If consumption of 10 tablespoons depletes a bag of coffee in three (3) weeks, then a default frequency may be determined to "3 week" intervals at which to reorder coffee. Note further, that usage rate 1152b may be shown to include power consumption curves 1155, which may be indicative of a power consumed by making quantities of coffee associated with a commercial operation coffee between 6 am to 10 am. Usage rate 1152c may include power consumption curves 1157 that represent power consumed by a pod-based coffee machine. Determining default frequencies for reordering coffee for users 1142b and 1142c may be similar to that computed for user 1142a.

Diagram 1100 also depicts weight-based usage sensors 1160a, 1160b, and 1160c associated with users 1142a, 1142b, and 1142c, respectively. These sensors may be used to determine usage of other products, or may be used to enhance accuracy of determining default frequencies for coffee by adding weight monitoring (e.g., detecting reductions in weight per usage) to power consumption monitoring.

Figure 12:
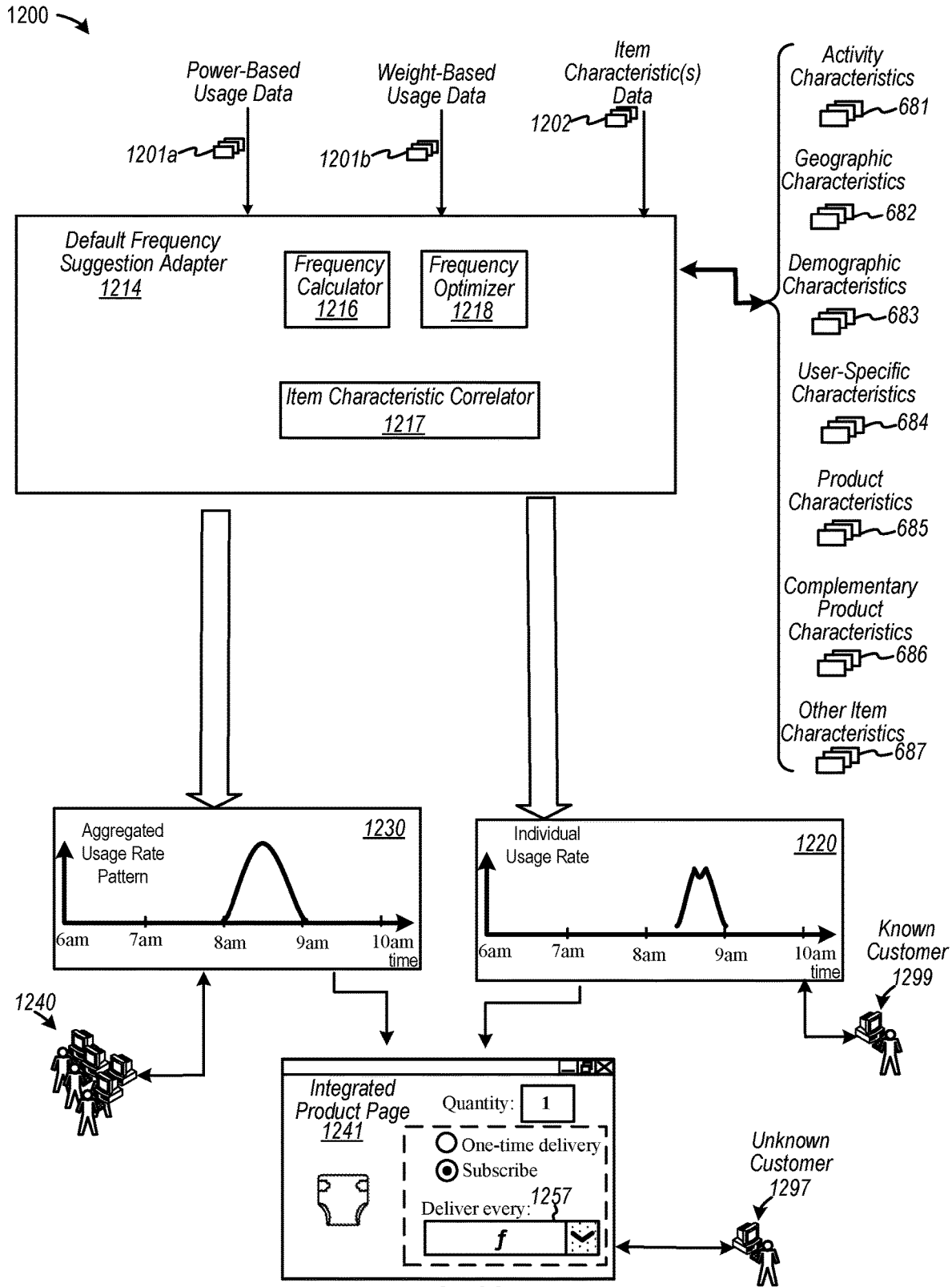
FIG. 12 is a diagram depicting yet another example of a default frequency suggestion adapter, according to some examples.

FIG. 12 is a diagram depicting yet another example of a default frequency suggestion adapter, according to some examples. Diagram 1200 includes a default frequency suggestion adapter 1214, which, in turn, includes a frequency calculator 1216, a frequency optimizer 1218, and an item characteristic correlator 1217. Item characteristic correlator 1217 may be configured to identify one or more item characteristics 1202 with which to correlate to determine or derive data that may be further used to derive or predict a default frequency as predictive frequency data (i.e., a predicted default frequency 1257). As shown, default frequency suggestion adapter 1214 may receive power-based usage data 1201a and weight-based usage data 1201b to generate a default frequency 1257 (or a predicted value thereof). According to some examples, elements depicted in diagram 1200 of FIG. 12 may include structures and/or functions as similarly-named or similarly-numbered elements depicted in other drawings.

According to various examples, default frequency suggestion adapter 1214 may implement one or more of SPS metrics, indicator data (e.g., "take rates," "cancellation rates," etc.), usage rate determinations (e.g., purchasing patterns, etc.), power-based usage data 1201a, weight-based usage data 1201b, and the like to determine an individual usage rate 1220 for a product (e.g., "Product X") as consumed or used by known user 1299. Or, default frequency suggestion adapter 1214 may implement any of the above to form an aggregated usage rate pattern 1230 that may be generate to represent a representative usage amount of "Product X" for consumers 1240 in a group.

In some examples, item characteristic correlator 1217 may compute all of the above and apply weightings to emphasize or deemphasize, for example, use of SPS metrics in determining default frequencies. For example, item characteristic correlator 1217 may apply "k-means clustering," or any other clustering data identification techniques to form clustered data and perform cluster analysis thereof. In some examples, item characteristic correlator 1217 may be configured to detect patterns or classifications among datasets and other data (e.g., data 681 to data 687) through the use of Bayesian networks, clustering analysis, as well as other known machine learning techniques or deep-learning techniques (e.g., including any known artificial intelligence techniques, or any of k-NN algorithms, linear support vector machine ("SVM") algorithm, regression and variants thereof (e.g., linear regression, non-linear regression, etc.), Bayesian inferences and the like, including classification algorithms, such as Naïve Bayes classifiers, or any other statistical or empirical technique).

Further, default frequency suggestion adapter 614 may also use other types of data with which to evaluate when calculating a default frequency. Examples of such data are shown in diagram 1200 and may include activity characteristics data 681 (e.g., characteristics indicative of participation in a sport or task), geographic characteristic data 682 (e.g., data related to a "home" or "business" location), demographic characteristic data 683 (e.g., aggregated subscriber data), user-specific characteristic data 684 (e.g., history of purchases by a user, etc.), product characteristics data 685, complementary product characteristics data 686, and other item characteristics data 687. Item characteristic correlator 1217 may be configured to correlate multiple variables through implementing a "self-learning" algorithm to, for example, run one or more cycles to train logic to select item characteristics 1202 and data 681 to data 687 for predicting a default frequency.

As an example, consider an unknown customer 1297 accesses integrated product page 1241. As customer 1297 is unknown, little information is accessible by default frequency suggestion adapter 1214 or an adaptive distribution platform. Default frequency suggestion adapter 1214 may use some known information to predict a default frequency 1257. For example, a geographic location data 682 specifying customer 1297 resides in New York City may be determined. Publicly-available information may provide user-specific characteristics 684 (e.g., identifying user 1297 as a resident or owner of a home), as well as demographic information characteristics 683 (e.g., user 1297 is a middle-aged female executive). Item characteristic correlator 1217 may use the inferred information to correlate to one or more distinctive aggregate usage rate patterns 1230 for a product or individual usage rate patterns 1220 to identify and select a default frequency 1257 with which to present to user 1297 when purchasing a product. Therefore, a subscription that reorders a product may be based on personalized or customized data and information, thereby reducing physical and mental "friction" in establishing a repeating order.

Figure 13:
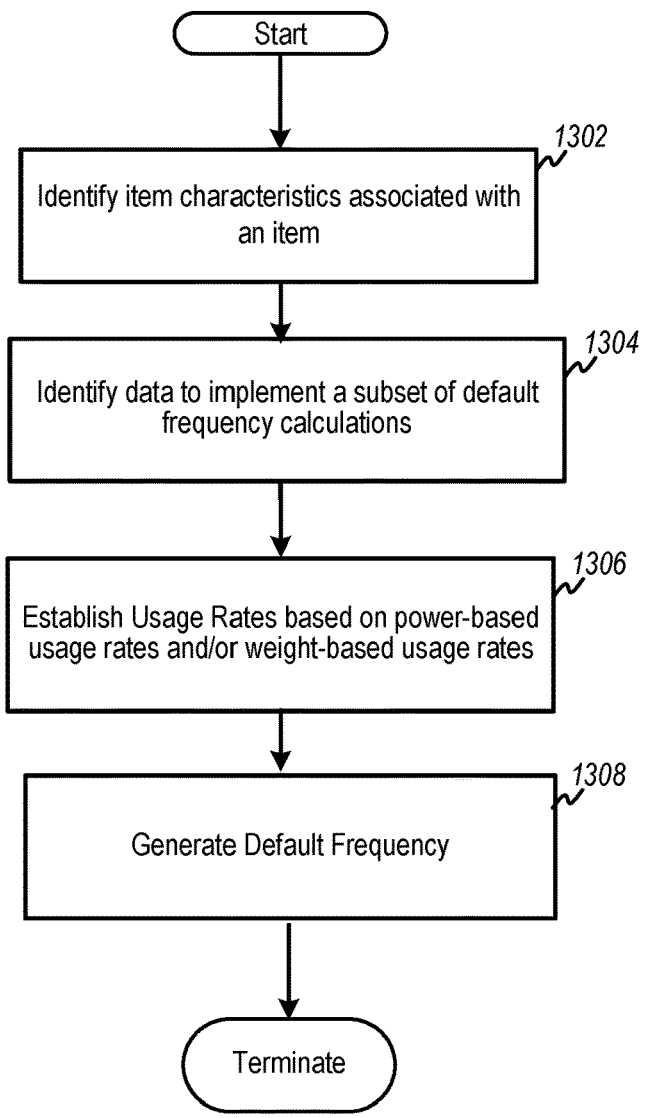
FIG. 13 is a diagram depicting an example of a flow to generate a default frequency, according to some embodiments.

FIG. 13 is a diagram depicting an example of a flow to generate a default frequency, according to some embodiments. At 1302 of flow 1300, one or more item characteristics associated with an item may be identified. In some examples, an item characteristic that may include data representing one or more characteristics of an item, shipment rate-related data, indicator-related data (e.g., SPS metric data), frequency attribute-related data, and/or usage-related data. In some examples, usage-related data may include power-based usage rate or a weight-based usage rate as provided by (or sensed by) corresponding sensors. At 1304, data to implement a subset of the fault frequency calculations may be identified. For example, a determination is made whether SPS metric data is available, whether power-based usage rate data is available, whether weight-based usage rate data is available, etc. For available data, one or more types of data may be used individually or in combination to select one or more techniques to determine or set a default frequency. At 1306, with data for power-based usage rates and/or weight-based usage rates available, usage rates may be established by the power and weight-based data. At 1308, from the usage rates, a default frequency may be selected for transmission to a user interface for subsequent selection.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

The invention claimed is:

1. A method comprising:
identifying item characteristics associated with an item, a first item characteristic being determined from data representing a product characteristic, at least a portion of the data representing the product characteristic being received from a computing device in data communication with and at an adaptive distribution platform including one or more processors and memory configured to execute instructions to provide facilitate adaptive scheduling services including replenishment services for multiple networked entities, the adaptive distribution platform being configured to cause generation of hybrid web pages that integrates interface portions originating at the adaptive distribution platform and a networked entity that includes a merchant computing system;
determining an item usage rate based on either a power-based usage rate or a weight-based usage rate, or both,
determining, using the adaptive distribution platform, a predicted event associated with depletion of the item based on the item usage rate;
generating data representing a subset of the item characteristics to form formatted data to integrate with a web page generated for the merchant computing system;
transmitting the formatted data to a user interface to cause display of a display portion based on the formatted data as an integrated portion of an integrated web page including the web page;
injecting the display portion to represent a subscription offer to form a hybrid web page; and
causing presentation of the hybrid web page at the computing device.

2. The method of claim 1 wherein the data representing the product characteristic includes data configured to identify at least one of a product classification, a product type, and a product cost per unit.

3. The method of claim 1 further comprising:
determining a frequency based on at least an item characteristic at which the item is scheduled for distribution in association with a subset of subscriber accounts.

4. The method of claim 1 wherein identifying the item characteristics associated with the item comprises:
a second item characteristic being determined from the user identification data configured to identify at least one of a shipping address, a payment instrument identifier, and an electronic account identifier,
wherein at least a portion of the user identification data is received from the computing device.

5. The method of claim 1 further comprising:
monitoring one or more item characteristics;
updating one or more values for the one or more item characteristics to form updated values;
adapting a frequency to form an adapted frequency based the updated values; and
formatting data representing the adapted frequency for injection in the display portion.

6. The method of claim 5 further comprising:
calculating modification of delivery characteristics based on the adapted frequency.

7. The method of claim 1 wherein determining a frequency based on an item characteristic comprises:
determining the first item characteristic including:
determining the item usage rate.

8. The method of claim 7 wherein determining the item usage rate comprises:
determining a depletion rate of the item.

9. The method of claim 7 wherein determining the first item characteristic comprises:
identifying data representing a number of subscriptions for the item for each of a subset of frequencies;
determining data representing a number of shipments for the item for each of the subset of frequencies;
generating a value of the first item characteristic for each of the subset of frequencies; and
selecting the frequency as a default frequency from the subset of frequencies associated with the with which to ship the item.

10. The method of claim 7 wherein selecting the frequency comprises:
determining a greatest value for the first item characteristic from a subset of frequencies.

11. The method of claim 7 wherein determining the first item characteristic comprises:
identifying data representing a number of subscriptions for the item for each of a subset of frequencies;
determining data representing a number of shipments for the item for each of the subset of frequencies; and
calculating values for shipments per subscriptions ("SPS") as a first metric.

12. The method of claim 1 further comprising:
determining a frequency based on an item characteristic including:
determining a second item characteristic; and
analyzing the second item characteristic to determine an adaption factor, the adaption factor being configured to adjust the frequency as a function of the second item characteristic.

13. The method of claim 12 further comprising:
presenting data that represents the adapted frequency as the frequency to the display portion.

14. The method of claim 12 further comprising:
calculating the second item characteristic based on one or more of a frequency indicator, a frequency attribute, and a usage characteristic.

15. The method of claim 1 further comprising:
receiving data indicative of an amount of power detected at a sensor, the sensor being configured to operate as a power-based usage sensor; and
calculating a second item characteristic based on power-based usage sensor data generated at the power-based usage sensor.

16. The method of claim 1 wherein determining a frequency based on an item characteristic comprises:
determining the item usage rate automatically.

17. The method of claim 16 wherein determining the item usage rate comprises:
receiving data indicative of an amount of power detected at a sensor, the sensor being configured to operate as a power-based usage sensor; and
determining the power-based usage rate based on data generated by generated at the power-based usage sensor.

18. The method of claim 16 wherein determining the item usage rate comprises:
receiving data indicative of an amount of weight detected at a sensor, the sensor being configured to operate as a weight-based usage sensor; and determining the weight-based usage rate based on data generated by generated at the weight-based usage sensor.

19. An apparatus comprising:

a memory including executable instructions; and a processor, responsive to executing the instructions, is configured to:

identify item characteristics associated with an item, a first item characteristic being determined from data representing a product characteristic, at least a portion of the data representing the product characteristic being received from a computing device in data communication with and at an adaptive distribution platform including one or more processors and memory configured to execute instructions to provide facilitate adaptive scheduling services including replenishment services for multiple networked entities, the adaptive distribution platform being configured to cause generation of hybrid web pages that integrates interface portions originating at the adaptive distribution platform and a networked entity that includes a merchant computing system;

determine an item usage rate based on either a power-based usage rate or a weight-based usage rate, or both, determine, using the adaptive distribution platform, a predicted event associated with depletion of the item based on the item usage rate;

generate data representing a subset of the item characteristics to form formatted data to integrate with a web page generated for the merchant computing system;

transmit the formatted data to a user interface to cause display of a display portion based on the formatted data as an integrated portion of an integrated web page including the web page;

inject the display portion to represent a subscription offer to form a hybrid web page; and cause presentation of the hybrid web page at the computing device.

20. The apparatus of claim 19, wherein the processor is further configured to:

select a frequency as a default frequency based on a value for shipments per subscriptions ("SPS");

receive data indicative of an amount of power detected at a sensor, the sensor being configured to operate as a power-based usage sensor; and determine the power-based usage rate as the item usage rate based on data generated by generated at the power-based usage sensor.

\* \* \* \* \*